(12) United States Patent
deSouza, Jr. et al.

(10) Patent No.: US 8,781,312 B1
(45) Date of Patent: Jul. 15, 2014

(54) AIRTIGHT BAG FOR CAMERAS AND OTHER ELECTRONIC EQUIPMENT

(71) Applicants: Jose Carlos Ferreira deSouza, Jr., La Canada, CA (US); Roberto Ferreira deSouza Miglioli, Sao Paulo (BR)

(72) Inventors: Jose Carlos Ferreira deSouza, Jr., La Canada, CA (US); Roberto Ferreira deSouza Miglioli, Sao Paulo (BR)

( * ) Notice: Subject to any disclaimer, the term of this patent is extended or adjusted under 35 U.S.C. 154(b) by 0 days.

(21) Appl. No.: 13/937,492

(22) Filed: Jul. 9, 2013

Related U.S. Application Data

(63) Continuation-in-part of application No. 13/908,976, filed on Jun. 3, 2013, now abandoned, which is a continuation-in-part of application No. 12/376,263, filed as application No. PCT/BR2006/000209 on Oct. 5, 2006, now Pat. No. 8,457,481.

(51) Int. Cl.
*G03B 17/08* (2006.01)

(52) U.S. Cl.
USPC .......................................................... 396/27

(58) Field of Classification Search
USPC .......................................................... 396/27
See application file for complete search history.

(56) References Cited

U.S. PATENT DOCUMENTS

| 2,537,303 | A  | * | 1/1951  | Cobb, Jr. et al. | 396/14   |
|-----------|----|---|---------|------------------|----------|
| 3,162,107 | A  | * | 12/1964 | Byers            | 396/27   |
| 4,033,392 | A  | * | 7/1977  | Less             | 206/316.2|
| 4,071,066 | A  | * | 1/1978  | Schaeffer        | 206/316.2|
| 4,176,701 | A  | * | 12/1979 | Welgan           | 206/316.2|
| 5,701,518 | A  | * | 12/1997 | Honda et al.     | 396/29   |
| 8,457,481 | B2 | * | 6/2013  | Miglioli et al.  | 396/27   |
| 2006/0177206 | A1 | * | 8/2006 | Takanashi        | 396/27   |
| 2007/0269194 | A1 | * | 11/2007 | Doran, Jr.      | 396/29   |
| 2009/0202232 | A1 | * | 8/2009 | Kawakami         | 396/27   |

* cited by examiner

*Primary Examiner* — Rodney Fuller
(74) *Attorney, Agent, or Firm* — Colin P. Abrahams

(57) ABSTRACT

A protective cover for a camera having a lens and an image viewer, the protective cover comprises a molded elasticized housing forming a chamber having a body shaped portion and a lens shaped portion for receiving the camera and lens respectively. The housing has at least one opening with a peripheral edge. A fastening system is provided for the opening. The fastening system has an internal fastener attachable to a part of the camera and an external fastener attachable to the internal fastener. The internal fastener and external fastener capture therebetween the peripheral edge of the lens opening when secured to each other, and the external fastener is being movable from a rest view position to an alternate view position to view a wider area of the camera or lens.

13 Claims, 39 Drawing Sheets

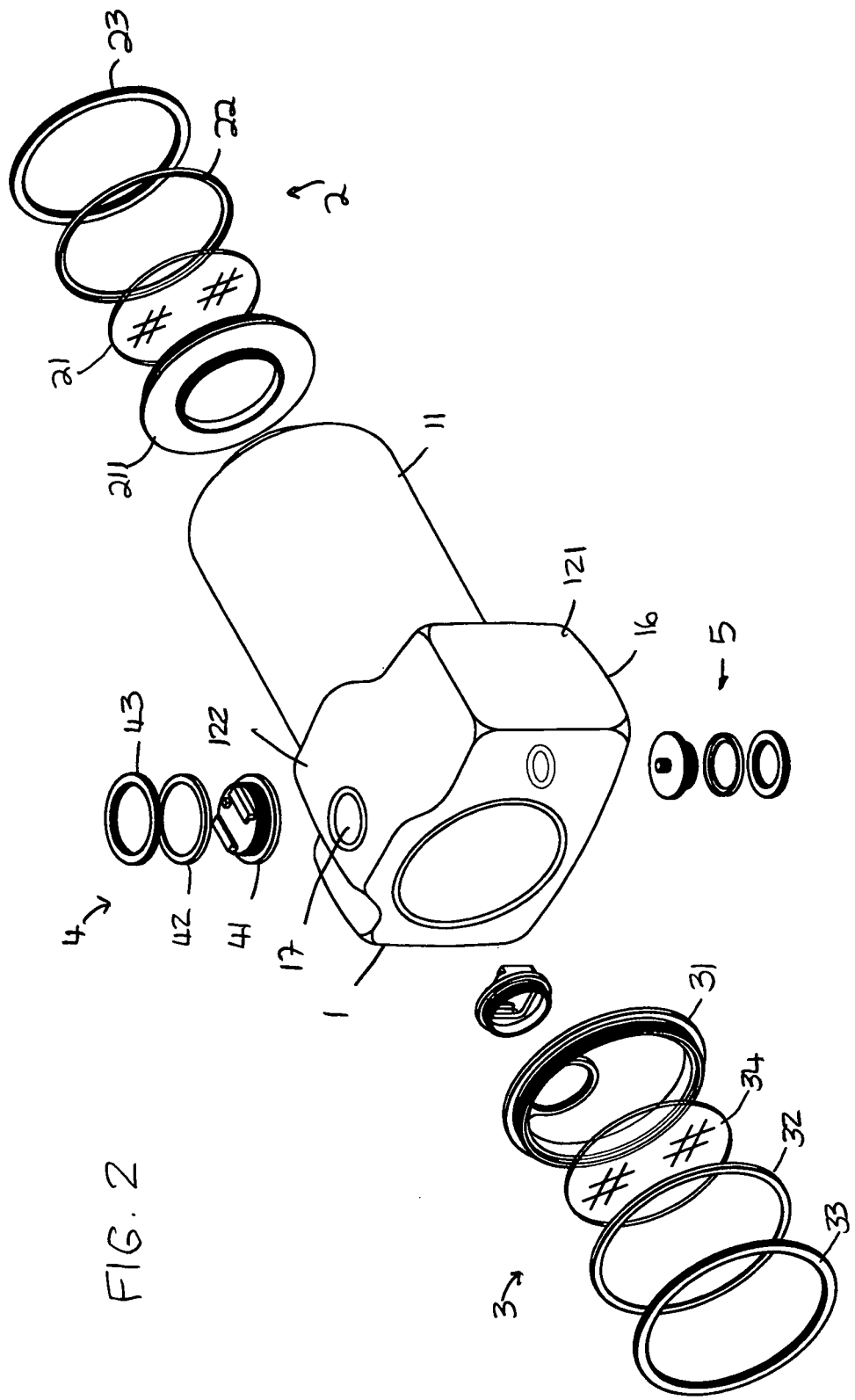

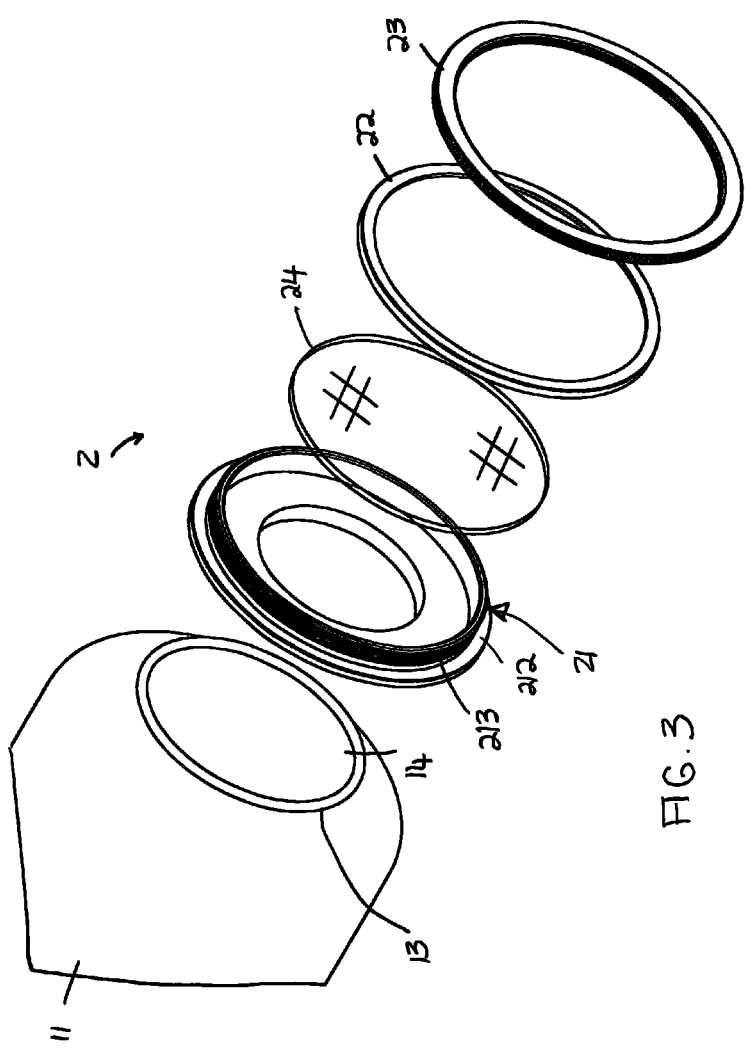

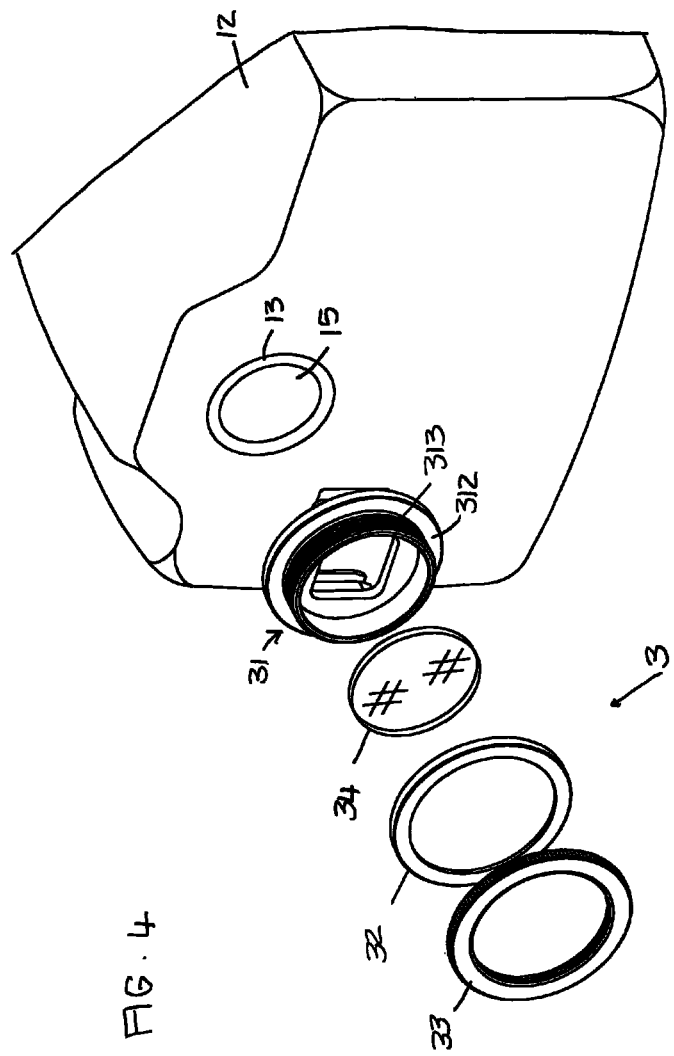

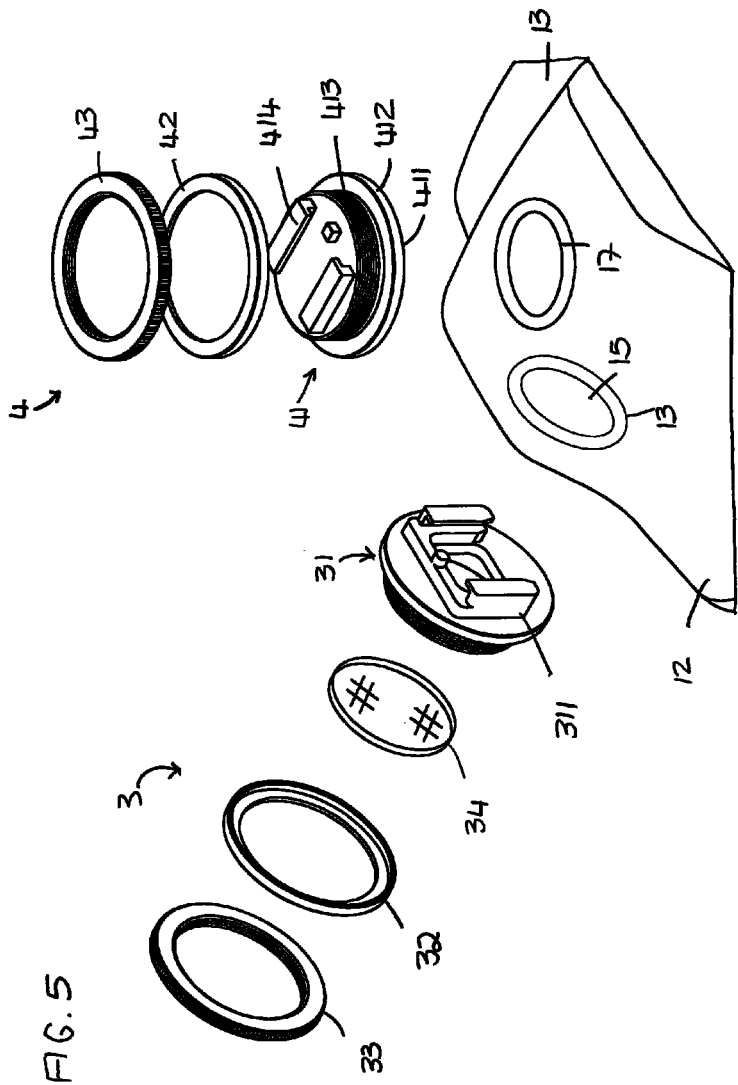

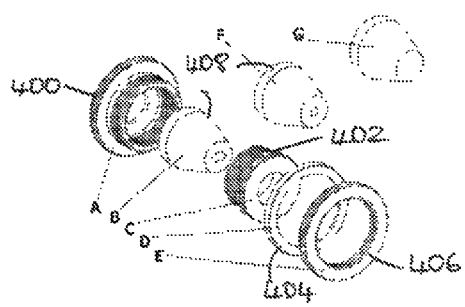
FIG. 38
FIG. 39
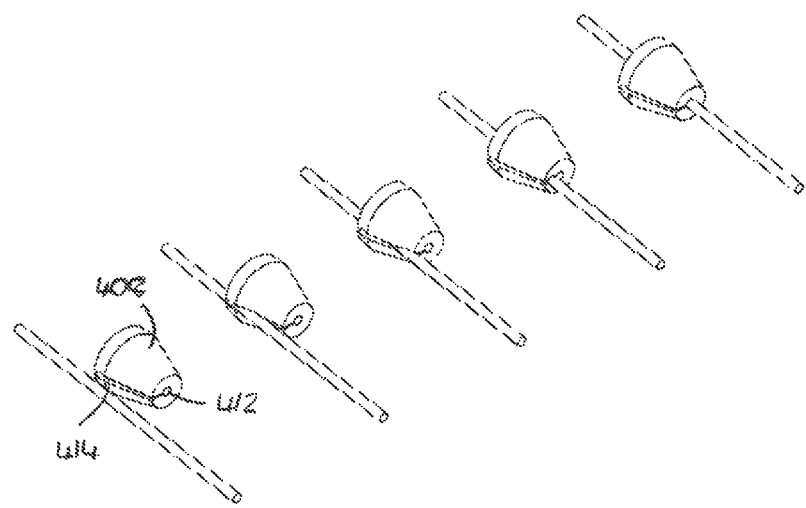
FIG. 40(a)

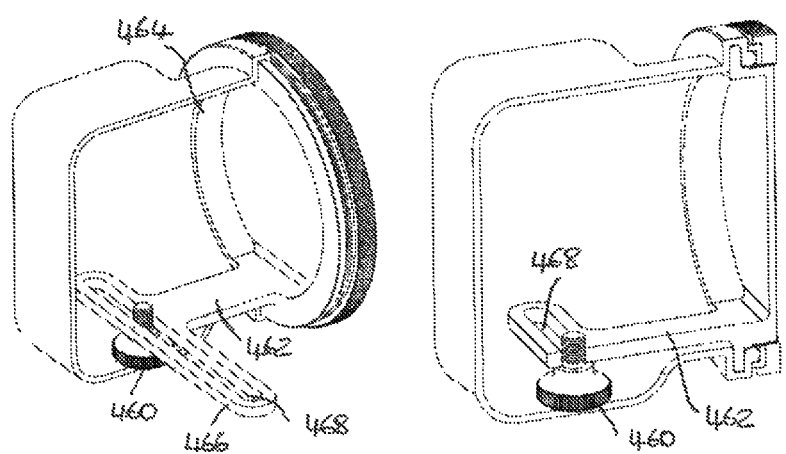

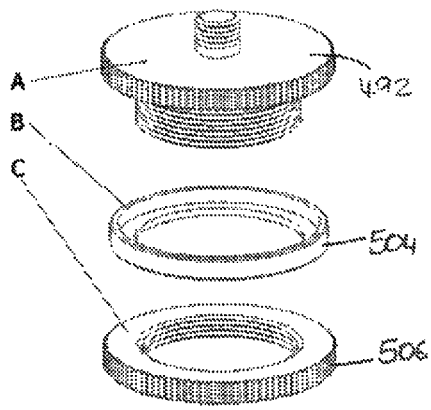
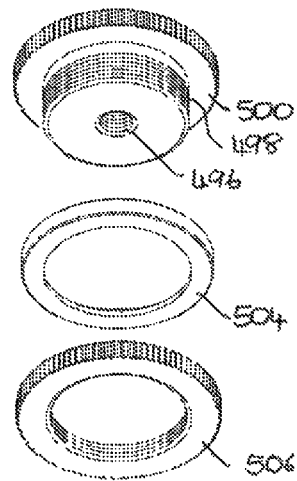
FIG. 46    FIG. 47
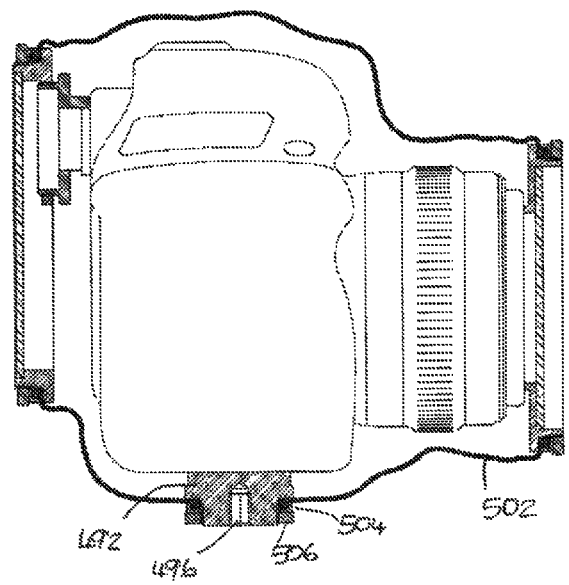
FIG. 48

AIRTIGHT BAG FOR CAMERAS AND OTHER ELECTRONIC EQUIPMENT

CROSS-REFERENCE TO RELATED APPLICATIONS

This application is a continuation in part application of U.S. patent application Ser. No. 13/908,976 filed Jun. 3, 2013, now abandoned, which is a continuation in part application of U.S. patent application Ser. No. 12/376,263 filed Nov. 5, 2009, issued as U.S. Pat. No. 8,457,481 on Jun. 4, 2013, the contents of which are incorporated herein by reference in their entirety.

FIELD AND BACKGROUND OF THE INVENTION

Electronic devices such as cameras, camcorders, cell phones, audio/video hand-held players, laptops, and personal organizers are a growing part of everyday life. These increasingly portable electronic devices are used for several purposes, including scientific, professional and leisure purposes. These devices, however, are seldom designed to withstand the hazardous environmental conditions in which they are often used. Moisture, dirt, dust, water, mud, sand, or other undesired environmental elements can damage them, render them inoperative, or prevent their use altogether.

The present invention patent presents a new an innovative way to protect electronic equipment such as cameras, camcorders, portable radios, cellular phones, laptops, audio/video devices, accessories, etc. It uses a flexible bag of innovative conception and is endowed with important technological and functional improvements, according to the latest engineering concepts, which grants it a series of technical, practical and economical advantages.

Devices do exist that are designed to withstand or resist hazardous environmental conditions. Some photo cameras, film cameras, portable radios, and audio devices are manufactured specifically for the aquatic environment. These are often developed with sealing systems or special customized chambers, but are also often heavier, bigger, and more expensive than conventional products or devices since they are customized for extreme use. For these reasons, these products have niche market penetration and are seldom adopted by a wide number of users.

In the specific case of cameras & camcorders, there are also accessories that, when coupled to the conventional product, allow for their use in humid, wet, or completely submerged (under water) environments. These accessories are usually in the form of water tight chambers that are custom sized and shaped to work only with a single make and model of the particular camera or equipment. They are manufactured with bulky rigid materials or semi-rigid materials that significantly increase the overall volume and weight of the camera or equipment. This increased weight also means underwater equipment is seldom compatible with (or at least desirable for) amphibian or above-water use.

SUMMARY OF THE INVENTION

According to one aspect of the invention, there is provided a protective system/set/kit using a flexible, hermetic bag for use with electronics. This innovative protective, sealing system/kit/set is based on an external, flexible, hermetic covering bag of various levels of transparency, robustness, thickness, and tactile composition that protects the electronic equipment inside it by isolating the external hazardous environmental conditions from the product. The invention may further comprise accessories that increase the flexibility of its use with several types of devices. These accessories may be glass or plastic windows for the electronic devices' displays, sight holes, filters for cameras lenses, and couplings for flashes, tripods, or headphones. These accessories can be removable or not, and are coupled to the cover or covering bag, some in a hermetic, water-proof fashion. The covering bag allows that such equipment be substantially totally isolated from the outer environment, therefore avoiding damage from environmental elements.

The invention of the flexible, malleable covering bag, in conjunction with its accessories, also presents a number of benefits, including:

(1) It works with various makes & models of particular lines of product. One system/kit/set can work for different cameras or laptops from a particular brand, for example, so the user doesn't have to purchase a new set for different products.

(2) It is light-weight and does not add significantly to the overall weight of the equipment being protected, maximizing portability and its use above and below water simultaneously.

(3) Its flexible form factor makes it adaptable to almost any means of transportation, and does not require specific carrying cases. In other words, because it is flexible and malleable, the covering bag and it's accessories occupy very little room and can be more readily available for use.

The present invention may also be comprised of a non-hermetic external covering flexible bag that provides all of the environmental protection described above, including water-resistance, without being water-proof.

The present invention, in one embodiment, may be comprised of the following components: the external covering flexible bag itself, and associated components that render it hermetic, such as an UV filter and an eye-window in the case of a camera. In some of its other embodiments, it can also comprise a flash support and a tripod connection, a cable adaptor, and other openings.

The flexible bag is a flexible and waterproof body of varying degrees of transparency, robustness, thickness, and tactile composition. The bag may be manufactured of rubber latex or silicone or any other suitable material and preferably in a manner void of stitching, joints, welds or junctions. The shape and size of this flexible bag, when applied, is preferably close to that of the equipment being protected, but this contouring feature allows it to be used for several different makes and models that present similar shapes and sizes. Due to the flexible composition of the material and its contouring properties when installed on the equipment being protected, the bag gives the user easy access to all the buttons and functions of the equipment, independently of its model and make. The flexible qualities of the protective bag also allow for tactile feedback from the equipment, giving the user better grip and greater control over the product/equipment. The flexible bag may also comprise glass or plastic panels, which allow the user access to LCD screens or other such information display areas of the equipment.

The installation of the flexible protective bag on the equipment is done through an opening in the bag itself, which may be in the form of an "O-ring". The flexibility of the material allows for the equipment to enter the flexible bag's opening without damaging either the bag or equipment.

In the specific case of photo and film cameras, the flexible bag may be provided with a set of circular holes that form windows of entry for the product itself. The flexible o-ring format rims allow for the tight sealing of the bag and other components or accessories, contouring the equipment without damaging either the product or the bag itself. The accessories in the case of camera are UV filters, eye-windows, flash supports and tripod connections. There are several models of covers, for all the possible combinations from cameras with flashes or tripods, up to cameras with LCD.

Hermetic Flexible Protective Bag Accessories

The UV filter accessory used for camera lenses, in one embodiment, is composed of three (3) parts: the lens-filter, the washer, and the screw-nut. The main body of the UV filter presents, on its aft portion, a cylindrical base with a screw thread that fits the standard support screw thread of the camera's lens. The central portion of the main body of the UV filter is composed by a baffle plate of a greater diameter and it is where the o-ring of the flexible bag is supported. The fore portion of the main body of the UV filter comprises a support with a screw, with a smaller diameter in relation to its central portion and it is where the coupling of the washer and the screw-nut is made. This main body of the UV filter presents a longitudinal through hole where the lens is glued. The lens can be manufactured with optical glass or acrylic. The washer is a ring shaped body and has an "L" shaped section and the lower portion of this section is in placed in the inner side of the washer and it is where the o-ring of the flexible bag is placed.

The UV filter may be manufactured in different sizes to match various makes and models of camera lenses. The sealing is done through the fitting of the O-ring of the flexible purse in the lower portion of the washer with the consecutive fastening of the screw-nut on the washer.

A systems or kit for the eye-window maybe comprised of four (4) parts: the covering bag, the washer, the screw nut and the lens. Similar to the UV filter set, in the eye-window, the washer also presents an "L" section, which fits in the main body for the sealing of the O-ring of the flexible purse through the screw-nut, and the lens is installed on the main body of the product. The difference in relation to the UV filter, besides the size, is the base of the main body that is secured on the camera either through a screw mechanism or through a sliding mortise support, which is placed on the display of the back panel of the camera. A variation for cameras with Liquid Crystal Displays contains a large viewing window as part of the covering bag. For this specific case, the diameter of the eye-window is larger and it presents, on its lower portion, an open area that allows for the viewing of the LCD screen of the camera. The eye-window can also be manufactured in several different dimensions according to the user's needs and can accommodate different cameras makes and models.

A system or kit with the flash support may be comprised of three (3) parts: the covering bag, the washer and the screw-nut. Similar to the tripod, it is attached to the body of the camera at the sliding flash fitting mortise. A support with a sliding fitting similar to the flash is placed on the upper portion of the main body of the flash support. The sealing system of this flash support is similar to the one of the UV filter, where the washer presents an "L" section that fits the main body for the sealing of the o-ring of the flexible bag through the screw-nut. The attached flash covers may be separate, or comprise flashes attached to the camera and contained in a single housing. The flashes in a separate housing may be tethered to the camera with, for example, a cable, or through a wireless connection. Wireless may be better in air but not as good in water. A flash glove may be used which may the flexible property to adjust to the contour of the equipment and hold the glass in front of the flash light source without requiring heavy, solid parts, and at the same time aligning with the sealing mechanism.

The connection for tripod may be comprised of three parts: the main body, the washer and the screw nut. Its attachment to the body of the camera is made by a screw thread that is proper for the fixation of tripods. The sealing system of this tripod connection is similar to the one of the UV filter, where the washer presents an "L" section, which fits the main body for the sealing of the O-ring of the flexible bag through the screw-nut.

The main bodies of the UV filter, eye-window, flash support and tripod connection are preferably partially placed inside the flexible bag to support the o-rings of their respective windows. Screwing the fittings of each respective washer seals the product, making it substantially airtight and hermetic. This way, the installed system protects the product from outside elements and conditions.

Non-Hermetic Flexible Protective Bag

There may also be non-hermetic applications for this invention. The covering bag can be used without the accessories that seal the product hermetically. These applications may protect the products in all but a water-resistant fashion, making covering water-resistant, but not water-proof.

Similarly to the hermetic flexible protective bags, the covering bag may contain viewing windows made of plastic or other materials that allow the user to see the LCD and other product functions.

In the case of cameras, the covering bag is applied through an o-ring or slit-like opening. The opening may contain a zipper or Velcro application to further seal entry of hazardous elements into the body of the bag. In the case of cell phones, the covering may contain an opening, window, and very small openings to allow better sound conductivity. In the case of an audio player, such as a portable MP3/MP4 player, the covering bag may contain an opening, window for display, and an opening for headphone jack. In the case of a portable DVD player or computer or laptop, the covering bag may utilize Velcro™ to protect the products while being transported, and windows for protection during operations. Different models would offer different levels of protection for various needs/uses.

BRIEF DESCRIPTION OF THE DRAWINGS

In the drawings:

FIG. 2 is a back perspective view of a hermetic flexible bag for cameras with an LCD screen, which has fittings for UV filter, eye-window for the LCD screen, flash support and tripod connection;

FIG. 4. is a detailed perspective view of the aft portion of the hermetic flexible bag and the structure of the eye-window;

FIG. 5 is a detailed perspective view of the upper portion of the hermetic flexible bag and the flash support structure;

FIGS. 16(a) to (g) show various embodiments of a camera protective cover with attachments including the external fastener which is bendable;

FIGS. 26 to 30 show various views of the domed port attachment of the protective cover of the invention;

FIGS. 38 to 40 and 40(a) show a series of illustrations of a connection in accordance with the present invention which allows for a cable to pass through a sealed attachment mechanism;

FIGS. 41 to 45 show a protective cover for a camera mounted thereto by means of a bracket attached to the tripod connector;

FIGS. 46 to 48 show a protective cover in accordance with the invention including a tripod adapter.

DETAILED DESCRIPTION OF THE INVENTION

Figure 1:
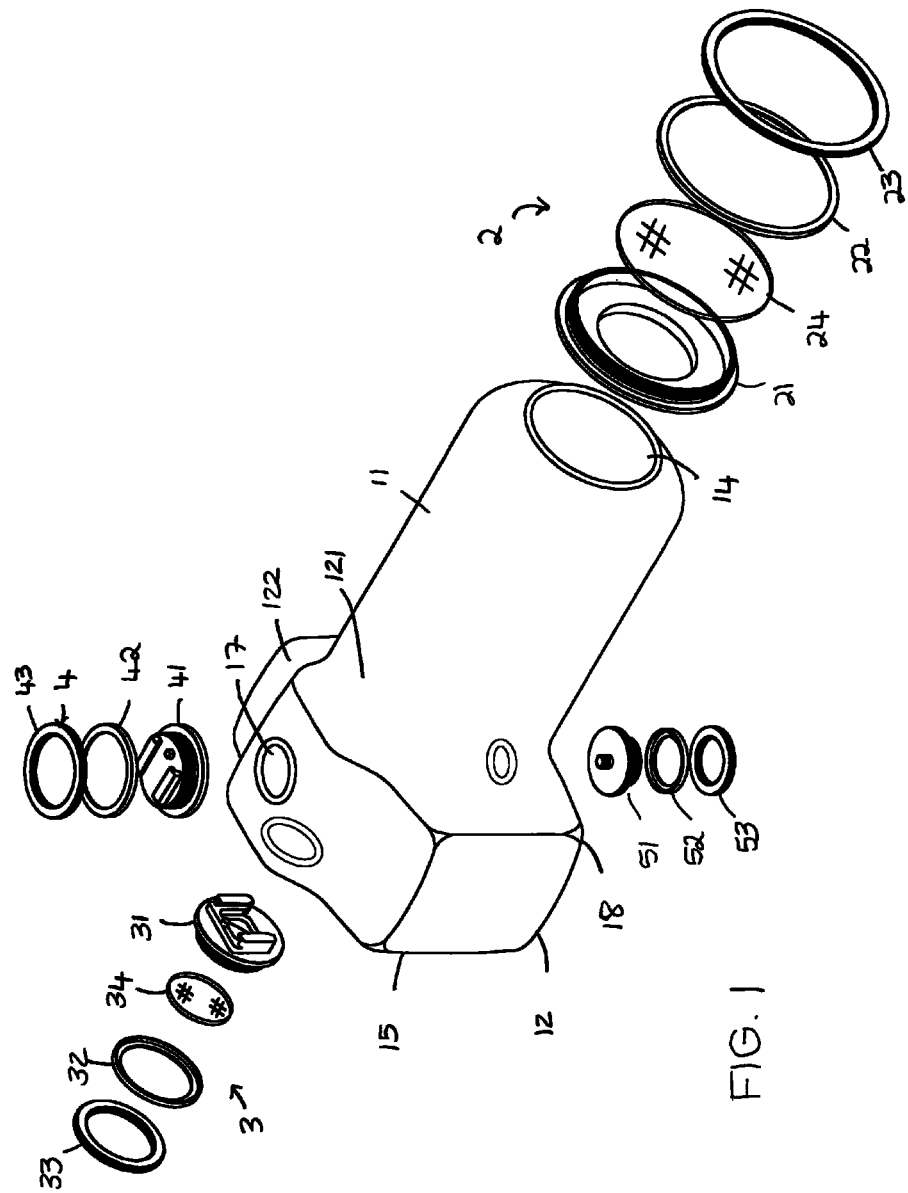
FIG. 1 is a front perspective view of a hermetic flexible bag of the invention for photo cameras and with fittings for UV filter, eye-window, flash support and tripod connection.
Figure 6:
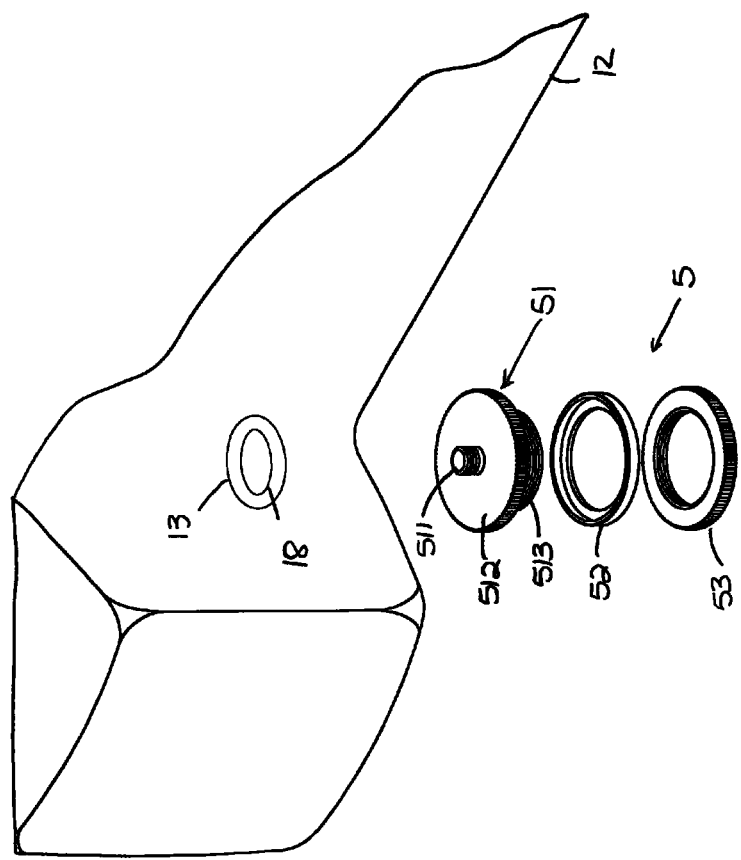
FIG. 6 is a detailed perspective view of the lower portion of the hermetic flexible bag and the tripod connection structure.
Figure 7:
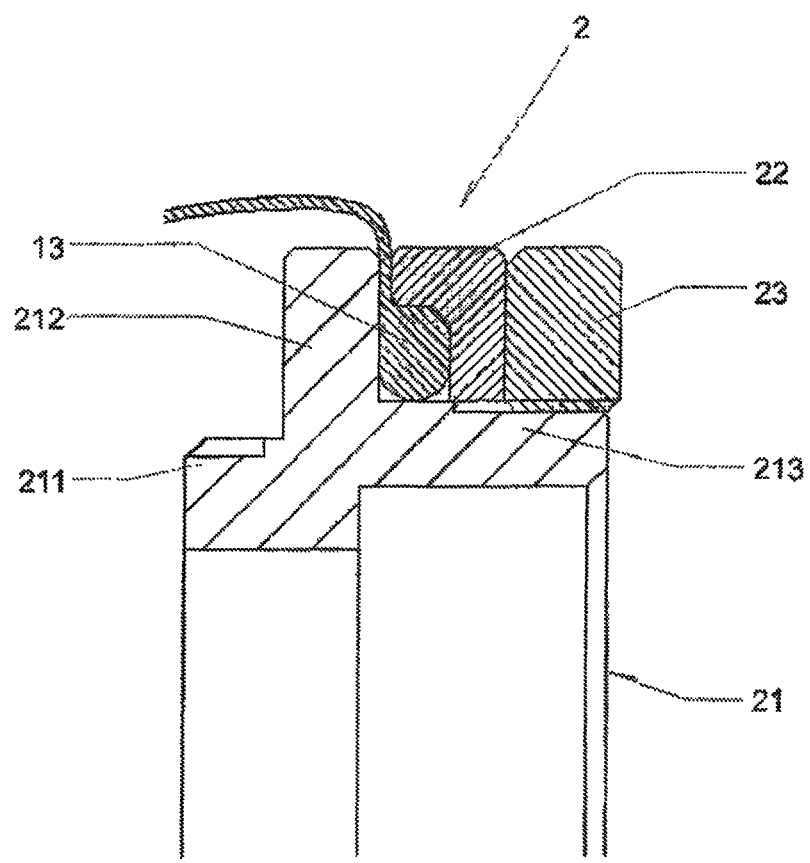
FIG. 7 is a detailed section view of the functioning of the sealing system involving the o-ring, the washer and the screw-nut.
Figure 8:
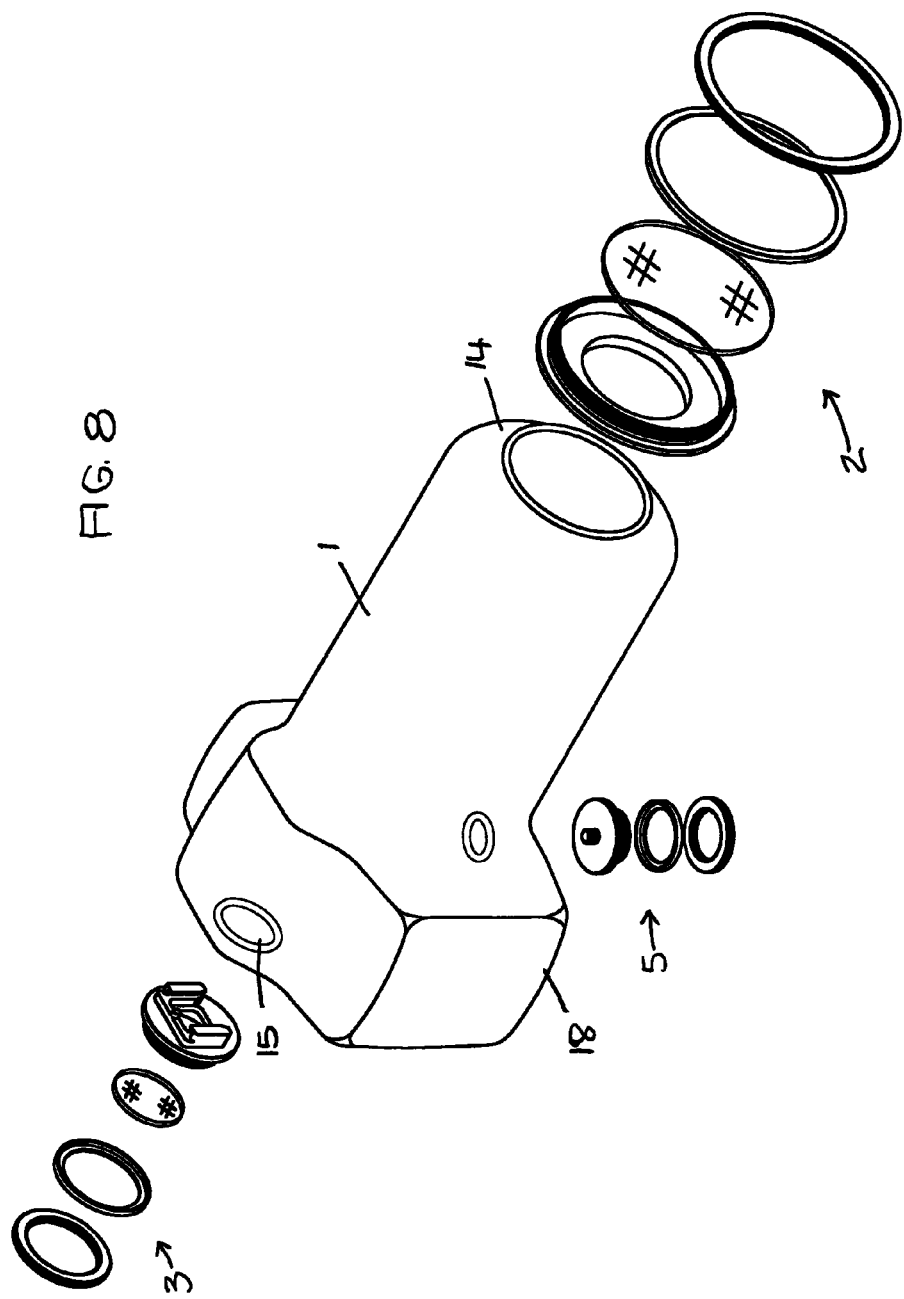
FIG. 8 is a perspective view of another embodiment of the hermetic flexible bag with UV filter, eye-window and tripod connection structures but without the flash support.
Figure 9:
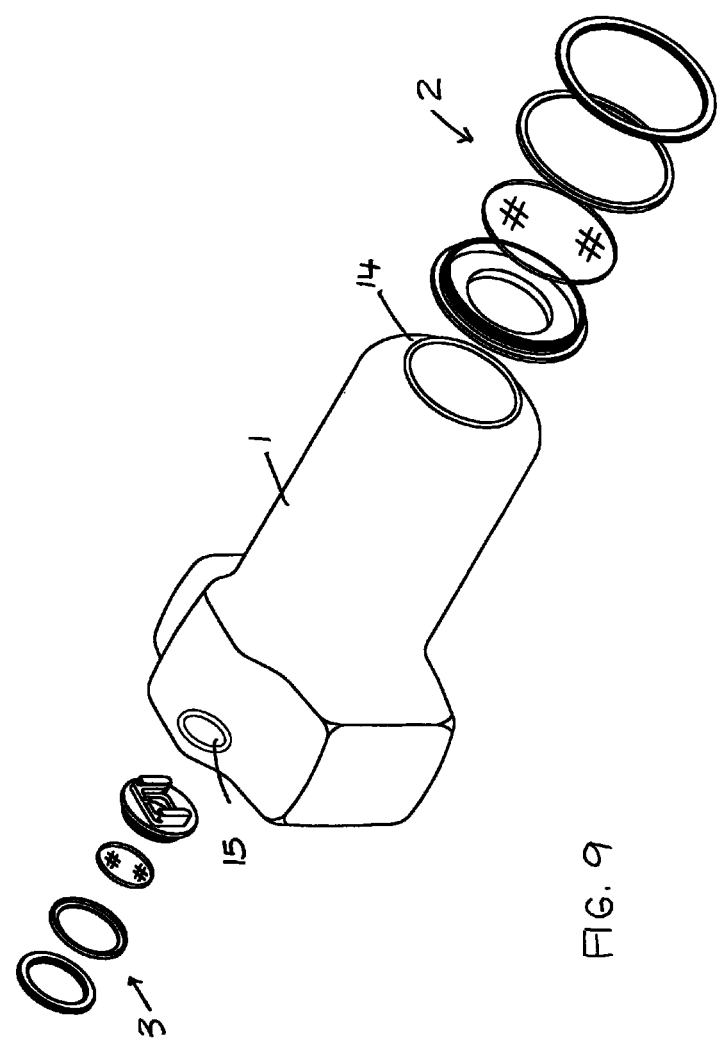
FIG. 9 is a perspective view of yet another embodiment of the hermetic flexible bag with just the UV filter and eye-window structures.
Figure 10:
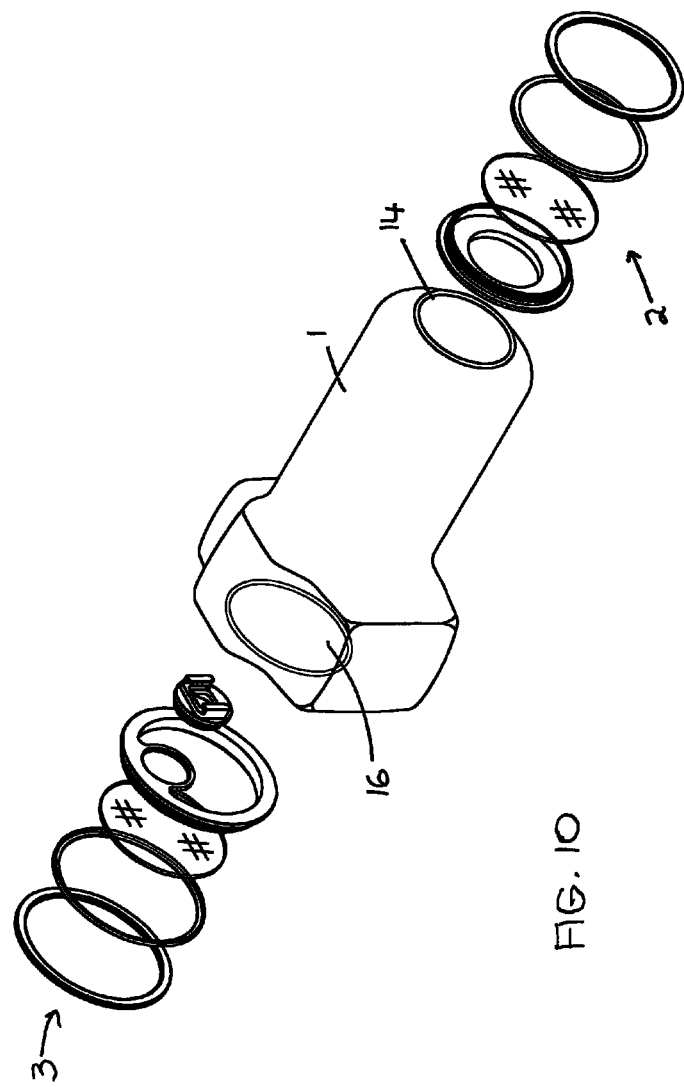
FIG. 10 is a perspective view of still another embodiment of the hermetic flexible bag for photo cameras with an LCD screen with just the UV filter and the eye-window for the LCD screen structures.
Figure 11:
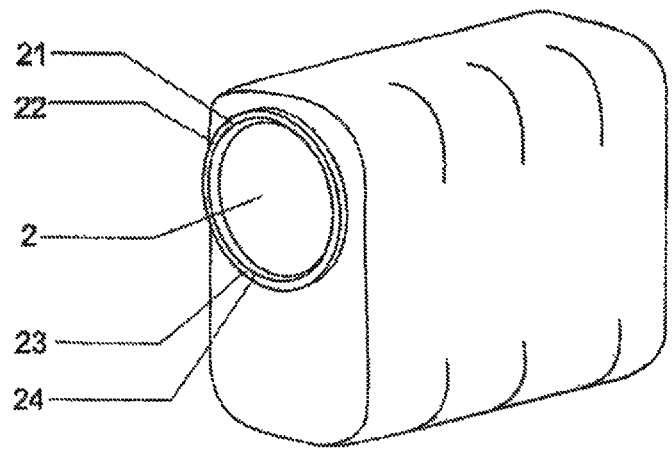
FIG. 11 is a perspective view of another embodiment of the hermetic flexible bag for film cameras of the camcorder type.
Figure 12:
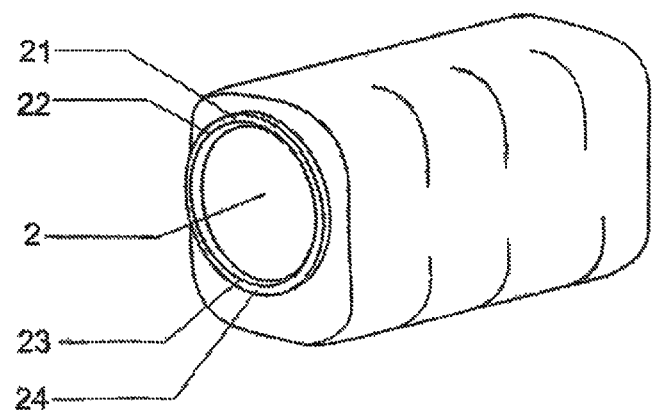
FIG. 12 is a perspective view of another embodiment of the hermetic flexible bag for another type of film camera, also of the camcorder type.
Figure 13:
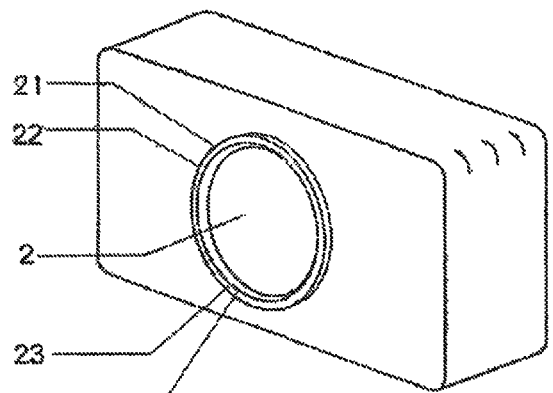
FIG. 13 is a perspective view of an embodiment of the hermetic flexible bag for digital cameras.
Figure 14:
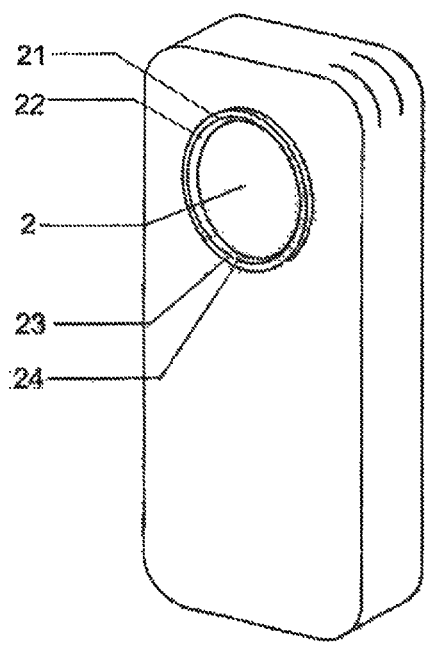
FIG. 14 is a perspective view of an embodiment of the hermetic flexible bag for a cellular phone.
Figure 15:
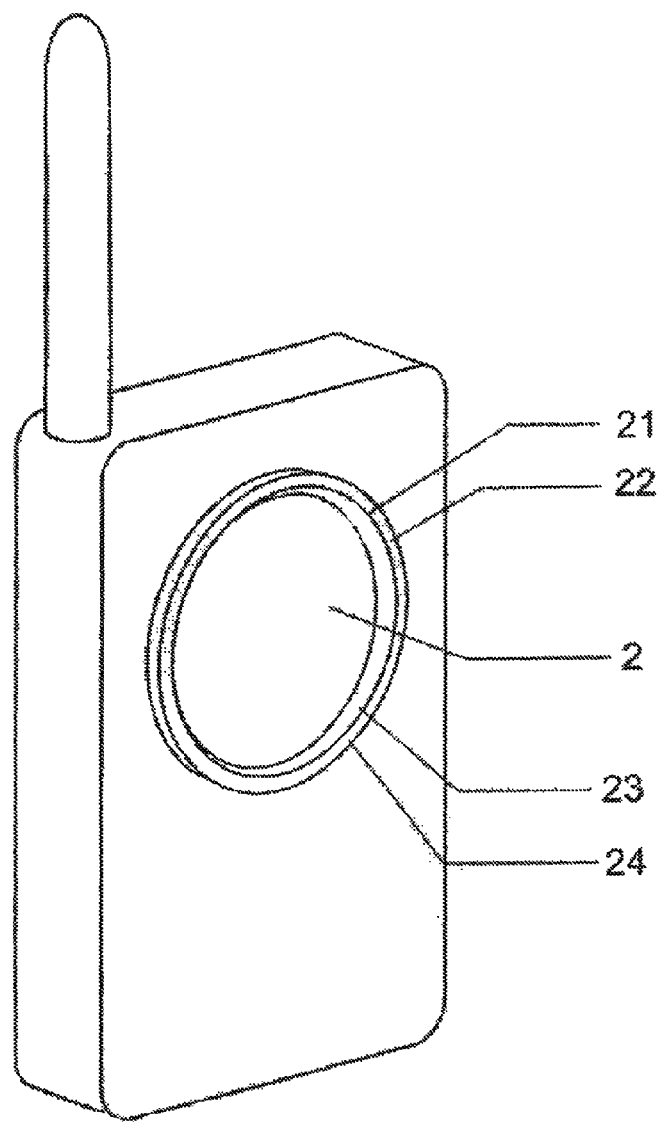
FIG. 15 is a perspective view of an embodiment of the hermetic flexible bag for a communication radio of the walk talk type.

As shown in the accompanying drawings, one embodiment of the hermetic flexible bag to protect cameras and portable electronic equipment comprises a flexible bag (1), a UV filter (2), an eye-window (3), a flash support (4) and a tripod connection (5).

The flexible bag (1) is a body manufactured with a flexible material, which could be transparent or not. When it is full, it presents a similar shape to the dimensions of the model of the camera to be protected, including the dimensions of the objective-lens portion (11) and of the back panel portion (12) with their respective resiliencies for hand support (121) and for the viewfinder (122).

The flexible bag (1) is provided with a set of circular holes (14), (15), (16), (17) and (18) that form windows. Each of these windows presents a rim in an o-ring shape (13). The fore portion of the flexible bag is provided with a hole (14) related to the coupling of the UV filter (2) on the support of the objective of the photo camera. The aft portion of the flexible bag (1) is provided with a hole (15) related to the coupling of the eye-window (3) on the support of the back panel of the camera. In the specific case of cameras with an LCD screen, the flexible bag is provided with a hole (16) of a greater diameter related to the coupling of the eye-window for LCD screens (3a). The upper portion of the flexible bag is provided with a hole (17) related to the coupling of the flash support (4) on the flash fixation support of the camera. The lower portion of the flexible bag is provided with a hole (18) related to the coupling of the tripod connection (5) on the fixation support of the camera tripod. There may be structural provisions for the use of a cable adaptor as further described herein.

The UV filter is placed on the fore portion of the flexible bag and comprises four parts: the main body (21), the washer (22), the screw-nut (23) and lens (24). The main body (21) is a body with a longitudinal through hole, presenting a predominantly cylindrical shape and it is formed by three parts: a fixation base (211) which is fixated through the screw thread on the standard support of the objective or lens of the camera; a central support (212) of a greater diameter that allows the support of the o-ring (13) of the hole (14); and a support with a screw (213) where the fitting of the washer (22) and the screw-nut (23) is made. The washer (22) is a ring shaped body with an "L" section, being the lower portion of this section placed on the internal side of the washer (22). The screw-nut (23) is a ring shaped body presenting a screw thread that enables the fastening of the washer (22) on the o-ring (13) of the hole (14). The lens (24) of the UV filter is manufactured in a translucent material and it is installed on the main body (21) through gluing or any other method that enables the full sealing between these two components.

The eye-window (3) is placed on the aft portion of the flexible bag and it is composed by four parts: the main body (31), the washer (32), the screw-nut (33) and lens (34). The main body (31) is a body with a longitudinal through hole, presenting a predominantly cylindrical shape and it is formed by three parts: a fixation base (311) that attaches itself through a screw or sliding mortise on back panel of the photo camera; a central support (312) of a greater diameter that supports the o-ring (13) of the hole (15) or (16); and a support with a screw thread (313) where the washer (32) and the screw-nut (33) are coupled. The washer (32) is a ring shaped body with an "L" section and the lower portion of this section is placed in the inner side of the washer. The screw-nut (33) is a ring shaped body presenting a screw thread that the enables the tightening of washer (32) on the o-ring (13) of the hole (15) or (16). The lens (34) of the eye-window is manufactured with a translucent material and it is installed on the main body (31) through gluing or any other method that allows the total sealing between those two components.

The flash support (4) is placed on the upper portion of the flexible bag and it is composed of three parts: the main body (41), the washer (42) and the screw-nut (43). The main body (41) is predominantly cylindrical shaped body and it is formed by four parts: the fixation base (411) that attaches itself through the sliding mortises of the flash of the photo camera; a central support (412) of a greater diameter that enables support for the o-ring (13) of the hole (17); a support with a screw thread (413) where the tightening of the washer (42) and the screw-nut (43) is made and an upper support (414) that presents the same shape of the sliding mortise of the photo camera flash. The washer (42) is a ring shaped body with an "L" section and the lower portion of this section is placed in the inner side of the washer. The screw-nut (43) is a ring shaped body presenting a screw thread that enables the tightening of the washer (42) on the o-ring (13) of the hole (17).

The tripod connection (5) is placed on the lower portion of the flexible bag and it is composed of three parts: the main body (51), the washer (52) and the screw-nut (53). The main body (51) is predominantly cylindrical shaped body that is formed by three parts: a fixation base (511) that attaches itself through the screw coupling of the own tripod fixation of the photo camera; a central support (512) of a greater diameter that supports the o-ring (13) of the hole (18); a support (513) with an external screw thread where the coupling of the washer (52) and the screw-nut (53) is conducted, and this support (513) also presents a internal longitudinal hole with a screw thread that is similar to the coupling hole of photo camera tripods. The washer (52) is a ring shaped body with an "L" section and the lower portion of this section is placed in the inner side of the washer. The screw-nut (53) is a ring shaped body presenting a screw thread which enables the tightening of the washer (52) on the o-ring (13) of the hole (18).

The present invention can present different embodiments according to the design of the different models of cameras and electronic equipment; these different embodiments enable the hermetic flexible bag to present fittings for all its components such as UV filter (2), eye-window (3) or eye-window (3a), flash support (4) and tripod connection (5); or it makes it possible for the flexible bag to present only some of these such as the UV filter (2) and the eye-window (3) as well as the other variations of such components.

The hermetic flexible bag of the invention may be manufactured with rubber latex or silicone or any other suitable material, preferably flexible, which is used with portable electronic equipment such as photo cameras, film cameras, camcorders, portable radios, cellular phones, audio/video devices and the like, and has the same features or design of this invention.

The flexible bag of the invention comprises a number of variations and forms of attachment, taking into account the structure and accessories typically used with the camera or other equipment, and some of these variations in accordance with the present invention are described and illustrated below.
Large Screen Display Viewfinder; Pivoting Viewing Window Opening In order to increase the amount of exposure of the viewable area, and to increase the viewable access to the equipment inside the enclosed flexible bag, the invention provides for a mounting mechanism that preferably attaches to or fixates onto the separate viewfinder of the camera (or other equipment) in a substantially stationary manner. This arrangement facilitates a pivoting capability of the mounting and maximizes as full a view as possible of the LCD or camera display viewfinder, and facilitates access to buttons, controls, and knobs that would otherwise be obstructed. This configuration allows the user to pivot the viewable opening window which forms a part of the mounting mechanism, preferably in both ways to the right or left, to increase or provide viewing access to the internal camera in a manner beyond what may be available for viewing in the stationary state. The embodiment allows the movement of the mounting mechanism into a position which facilitates enhanced viewing of the camera through the window of this mounting mechanism. The mounting mechanism will return to position upon release by the user. The mounting mechanism will permit repeated movement and changes of position without causing any damage to the opening attachment components or to the cover or flexible bag itself.

Figure 16A:
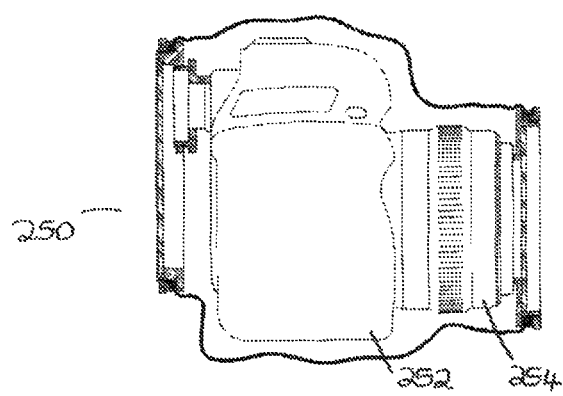
Figure 16B:
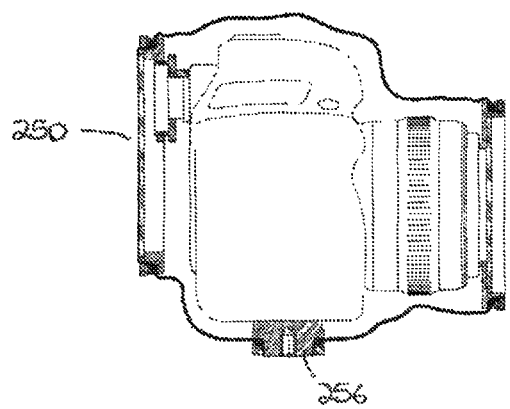
Figure 16A:
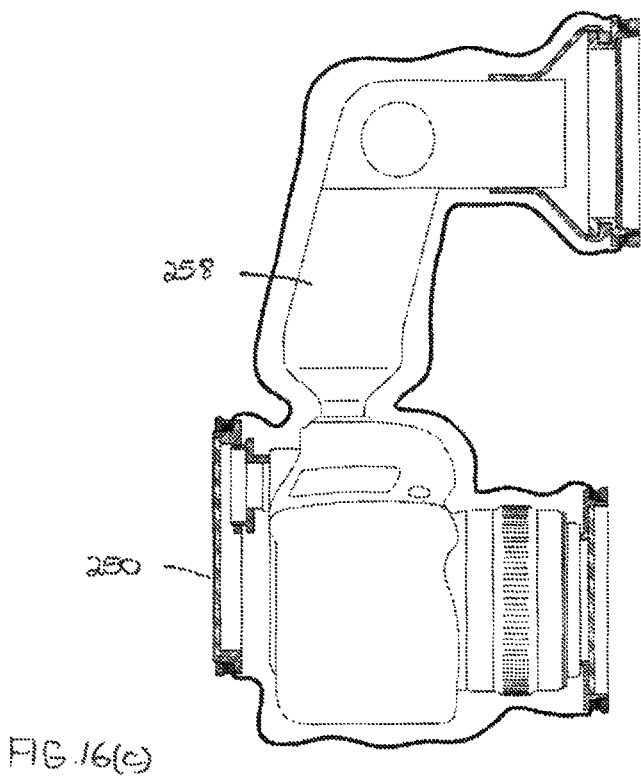
Figure 16B:
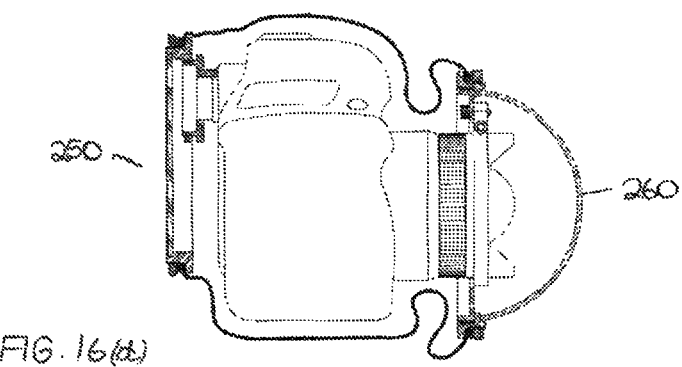
Figure 16E:
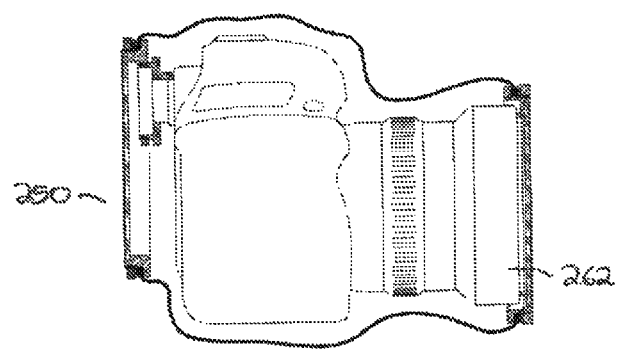
Figure 16F:
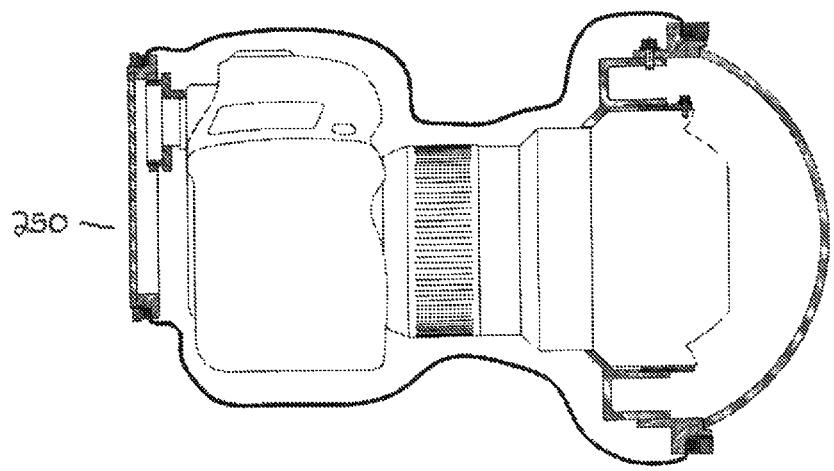
Figure 16G:
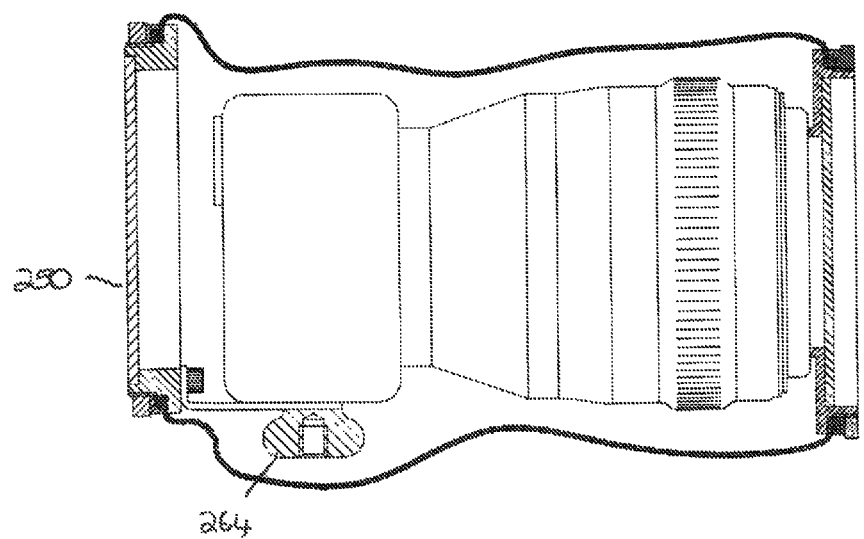

FIGS. 16(a) to (g) show this bendable or flexible connecting mechanism which can be used in several different context on different camera configurations. FIG. 16(a) shows the adjustable mounting mechanism 250 with a camera 252 having a regular lens 254. FIG. 16(b) shows the mechanism 250 with a camera having the tripod connection 256 (to be described more fully below, FIG. 16(c) shows the mechanism 250 with a flash 258 on the camera, FIG. 16(d) shows the mechanism 250 with a camera having a dome 260, FIG. 16(e) shows the mechanism 250 with a camera having a mounted extension 262, FIG. 16(f) shows the mechanism with a camera having an extension and a dome, and FIG. 16(g) shows the mechanism 250 as part of a flexible bag mounted on the camera via the tripod connector 264, to be described further below.

Figure 17:
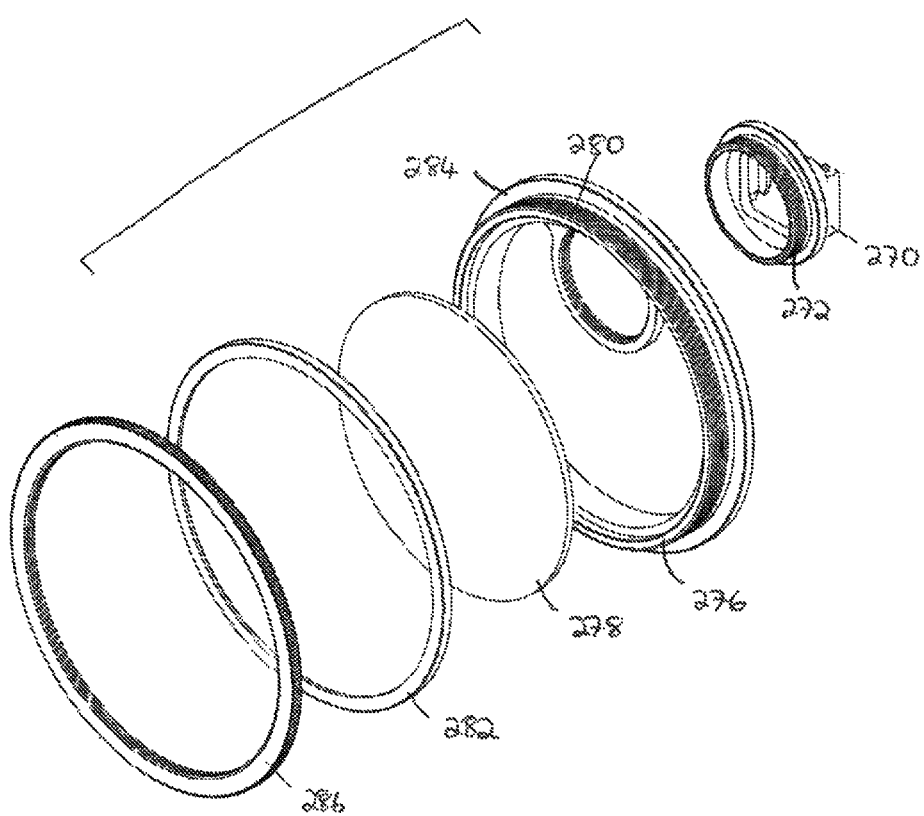
FIGS. 17 to 21 show various detailed views of the bendable connection system in accordance with the invention.

FIG. 17 of the drawings shows the mounting mechanism 250 in accordance with one aspect of the invention, in an exploded view to clearly illustrate its components. The mounting mechanism 250 comprises a camera connector 270 which connects around the viewfinder of the camera. The camera connector 270 has a threaded portion 272 which connects to a corresponding threaded portion 274 of adjustable component 276. A seal is formed therebetween. A window 278 fits within a space of the adjustable connector 276. The adjustable connector 276 has an outer thread 280. An L shaped O-ring 282 slides over the outer thread 280, and the flexible bag (not shown) is sealingly captured between the O-ring 282 and a flange 284 on the flexible connector 276. A threaded O-ring 286 engages with the outer thread 280, and is tightened to the necessary extent so as to firmly capture the flexible bag between the flange 284 and the O-ring 282 to provide an airtight and want to type seal between the flexible bag and the mounting mechanism 250.

Figures 18, 19:
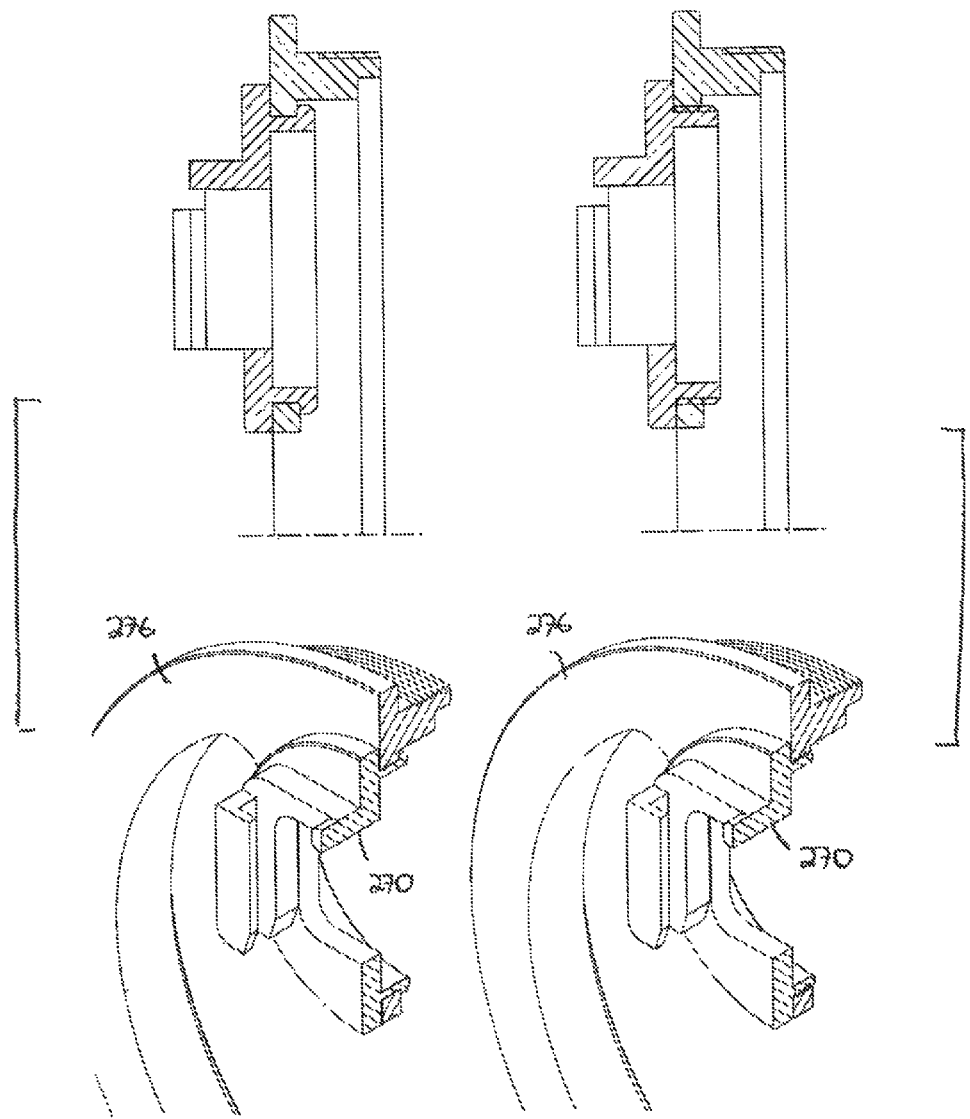

FIGS. 18 and 19 each show a detailed cross-section and perspective view of the mounting mechanism 250, in two different embodiments. FIG. 18 shows an embodiment where the adjustable connector 276 as a snap connection with the camera connected 270, while FIG. 19 shows a similar arrangement but with a threaded connection therebetween.

Figure 20:
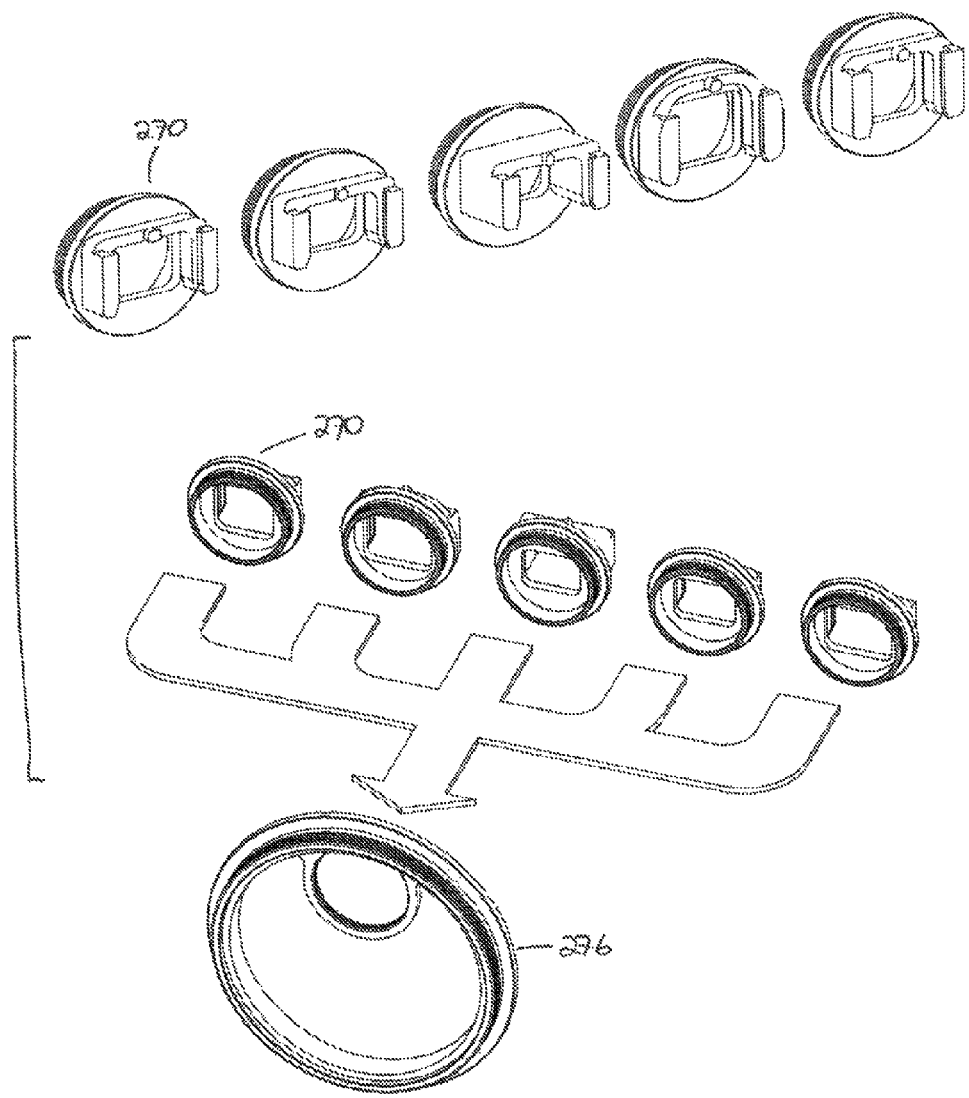

FIG. 20 of the drawings shows a series of five camera connectors 270 off slightly different configurations and styles which may be used on a spectrum of cameras. This figure also shows how each of the different camera connectors 270 is constructed so as to be attached to the same adjustable component 276. In this way, different cameras which vary in the viewfinder construction can all be accommodated so that appropriate attachments can be made for utilizing this large screen display viewfinder.

Figure 21:
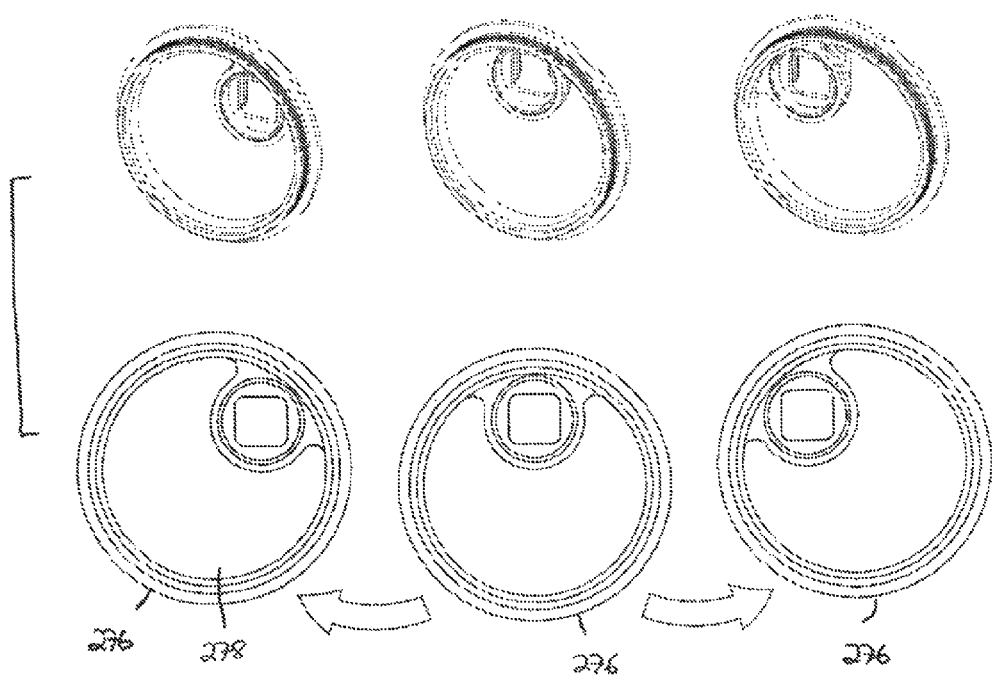

FIG. 21 of the drawings shows how the adjustable component 276 can be moved so that the window to 78 provides viewable access to different parts of the camera. This is achieved by a not fully tightened mounting on the threaded portion 272 so that the adjustable screw on component 276 can be rotated, such as for example a full or half or quarter turn, about it. Since this connection is not one that effects the airtight seal, slightly less than a full tightened connection will not affect the seal. The center figures, the top being perspective and the bottom being a front view, shows the adjustable component 276 it standard position. On the left, the adjustable component 276 has been rotated somewhat by the user in a clockwise direction so that the window 278 provides viewing access to a different portion of the camera. On the right, rotation is in a counterclockwise direction. When desired by the user of the adjustable component 276, its position is moved back or is restored to the standard position shown in the center drawings of this FIG. 21.

Wide Angle Protection Attachment; Flat or Domed Port

A domed or curved transparent optical port allows increased, or better wide-angle, viewing from the imaging device such as a camera at a greater angle than that permitted by flat glass optical ports. The attachment of a domed port may be carried out by allowing an internal component to be placed from behind the lens towards the front lens and meeting a registering part so as to provide a hermetic seal while anchoring itself to the internal lens or optical component it is protecting.

Most wide angle solutions in the market provide an attachment to the camera body, but not to the lens at its extremity, thereby creating a "floating" situation for the lens. The present invention, in addition to the camera mounting, also has mounts around the lens, preferably at the optical or lens extremity, and far more securely stabilizes the imaging device within the enclosure. This may be due to the fact that multiple attachments at different ends of the equipment are provided instead of attachment just on the body. This may reduce or even eliminate the floating of the equipment or camera within the enclosure. It may also reduce the optical distortion and variation as a result of the enclosure, as well as provide increased tactile feedback to the user. The wide angle lens adaptor creates thread-based access to the optical lens that accepts threaded accessories such as filters, extensions, and the like. The present invention takes advantage of this configuration in a beneficial way to provide a variable, adjustable nodal point that travels along the optical focal point of the lens.

Figure 22:
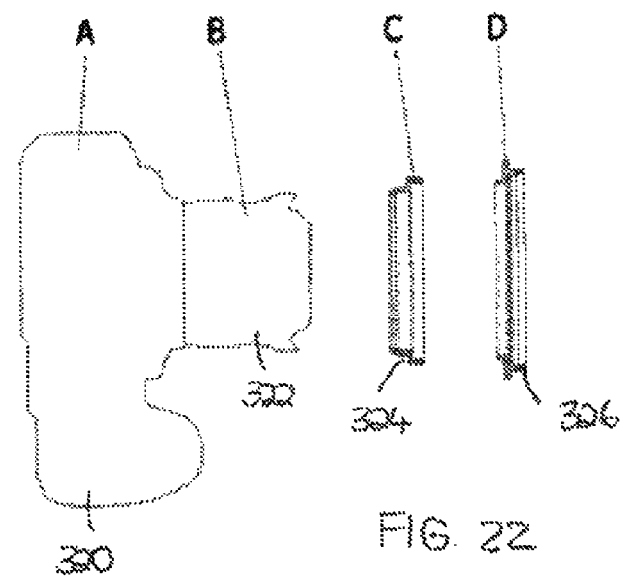
FIGS. 22 and 23 show a camera protective cover in accordance the invention with a flat port and a domed port respectively.

Reference is now made to FIGS. 22 to 32 of the drawings. Generally, these drawings show respectively a flat port attachment, and a domed port attachment. The equipment such as the camera has a lens which is released or disconnected from the camera so that a wide angle attachment can pass or slide over the lens from the base of the lens towards the front of the lens. The wide angle attachment then attaches to a dome support, which in turn attaches to the domed port. Screws may be used to fasten the domed port to the dome support when domed. When the port is flat (that is, not domed), as shown in FIG. 22 of the drawings, it screws onto a threaded portion in the conventional manner.

This arrangement will now be described in conjunction with the detailed illustrations thereof in FIGS. 22 to 32 of the drawings.

Figure 23:
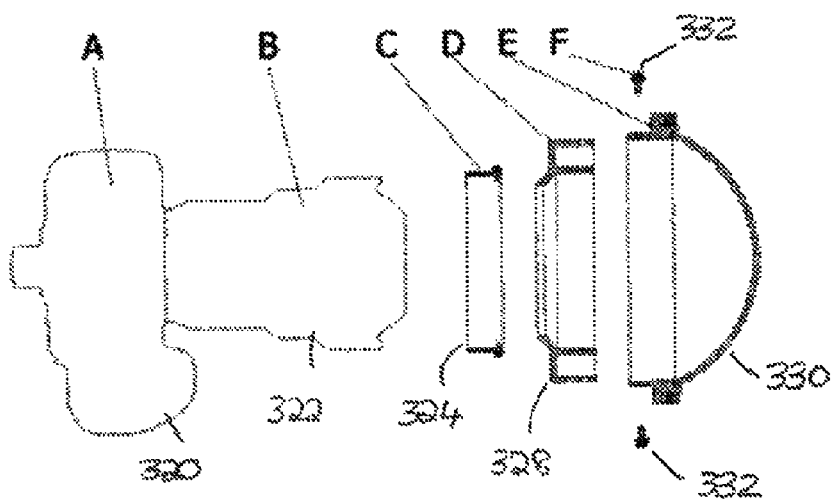

FIG. 22 of the drawings shows a wide-angle protection attachment with a flat port, while FIG. 23 shows a wide angle protection attachment with a domed port.

FIG. 22 shows a camera 320 having a lens 322. There is provided a lens attachment 324 to which a flat port attachment 326 is connected. FIG. 23 shows a camera 320 with a lens 322 and lens attachment 324. There is further provided a dome support 328, to which a dome port 330 can be attached. Screws 332 are provided for the attachment of the domed port 330 to the domed support 328.

Figure 24:
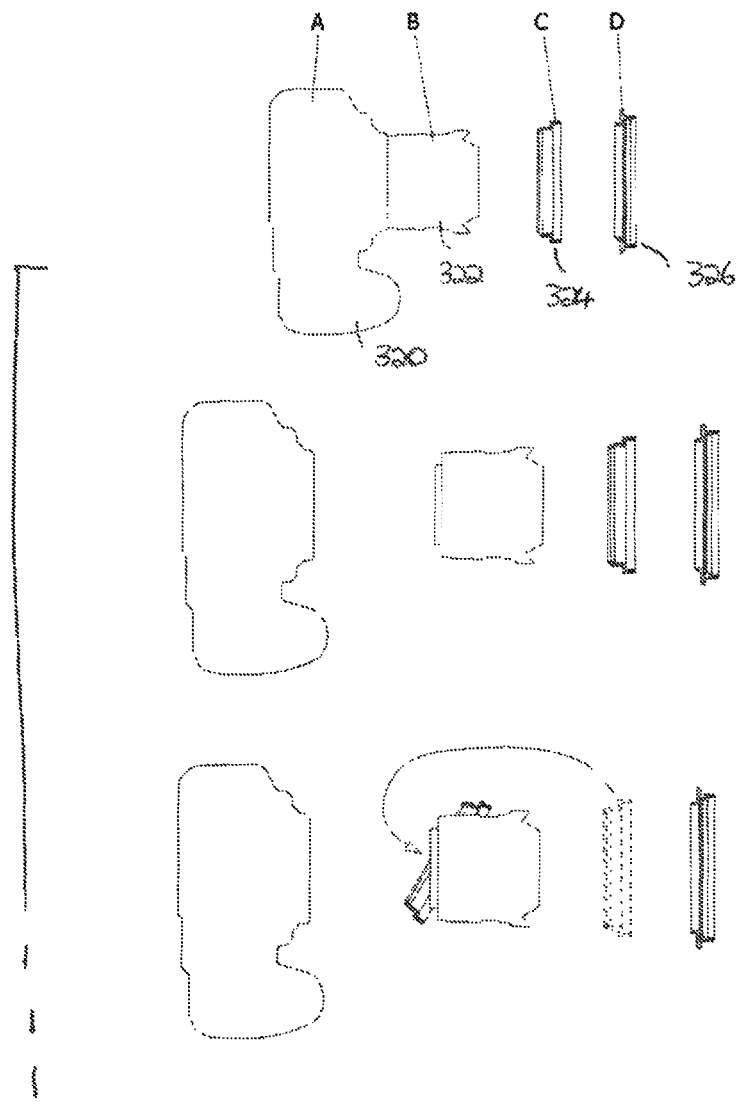
FIG. 24 is a series of sequential illustrations showing attachment of a flat port to a camera lens.
Figure 24:
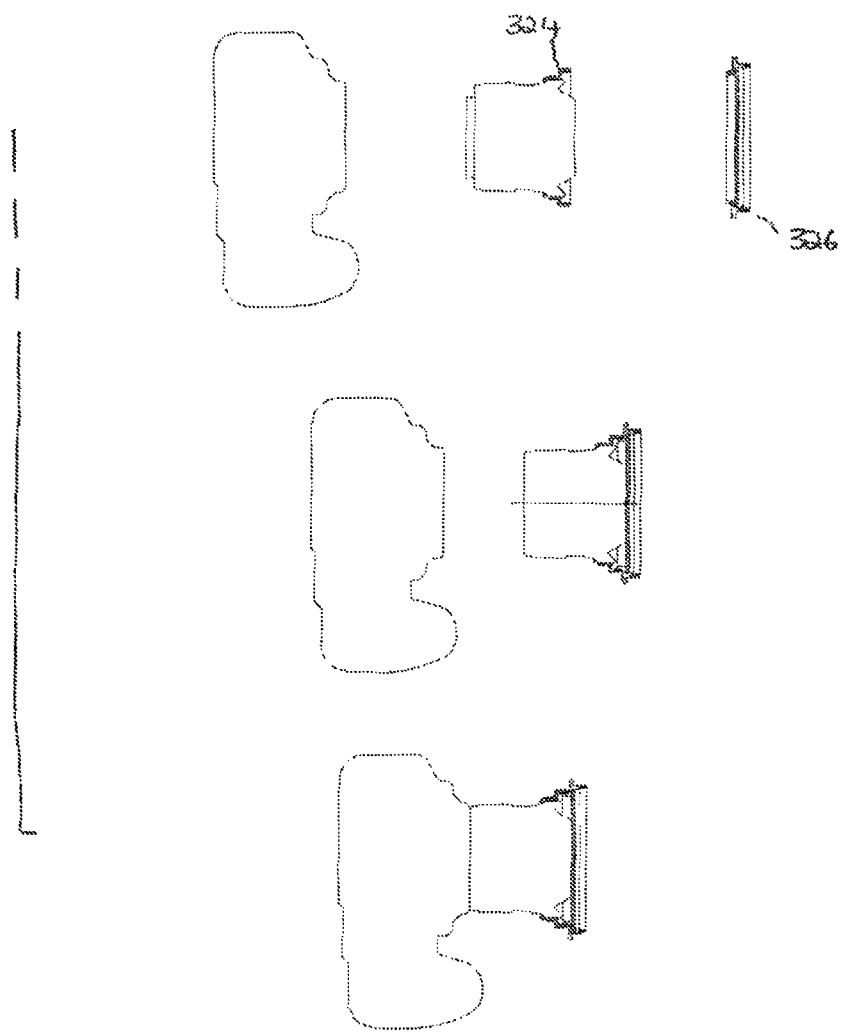

FIG. 24 shows a series of drawings for illustrating the connection of the flat port arrangement. In the first drawing of FIG. 24, there is shown the camera 320 connected to the lens 322, with the lens attachment 324 and flat port attachment 326 in front of the lens. In the second drawing, the lens has been disconnected from the camera, while in the third drawing, the lens attachment 324 is moved to the back of the lens 322, and placed around it. In the fourth drawing, the lens attachment 324 has been moved to the forward end of the lens 322 and is attached to the lens when in this position, as shown in the fourth drawing. In the fifth drawing, the flat port attachment 326 is attached to the lens attachment 324, and in the sixth and last drawings, the lens which has mounted thereon these two components is reattached to the camera.

Figure 25:
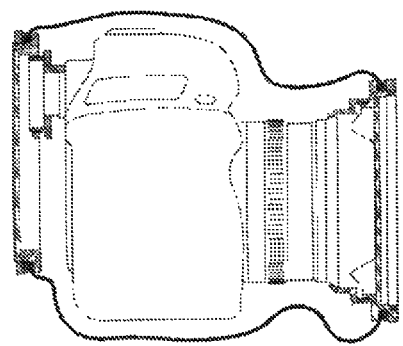
FIG. 25 is a side view of a camera having the flat port as illustrated in FIG. 24 with the protective cover thereon.

FIG. 25 of the drawings shows a camera with the wide-angle protection attachment thereon, as described with reference to FIG. 24, and wherein the flexible bag has been attached. In this regard, it is to be noted that the flat port attachment 326 provides the necessary connectors for receiving the various O-rings and forming the space for capturing and holding the flexible bag, as has been described with reference to previous drawings. One example of such an attachment arrangement is shown in various forms in FIG. 16 of the drawings as well as other drawings in this application which show various embodiments for seizing the capturing the flexible bag.

Referring to FIGS. 26 to 29, there is shown a detail of the arrangement wherein a domed port is attached to the camera and flexible bag. These figures show the camera lens or attachment 340, and expandable ring 342 which is mounted on the lens 340 and tightly secured thereon using screw 344. The expandable ring 342 is connected to intermediate ring 346 by means of two screws 348 passing through the threaded apertures on the expandable ring 342 and intermediate ring 346 respectively. A dome 350 having a thread 352 is placed against and screws onto the intermediate ring 346 using corresponding threads. An inner O-ring 354 slides over the dome 350, and the inner O-ring 354 and flange 356 on the dome 350 capture therebetween the periphery of the flexible bag as is being described in previous embodiments in this specification. An outer O-ring 358 screws onto the thread 352 on the dome 350 and can be appropriately tightened to capture and squeeze the flexible bag between the inner O-ring 354 and flange 356 to ensure a watertight and airtight seal.

Figure 26:
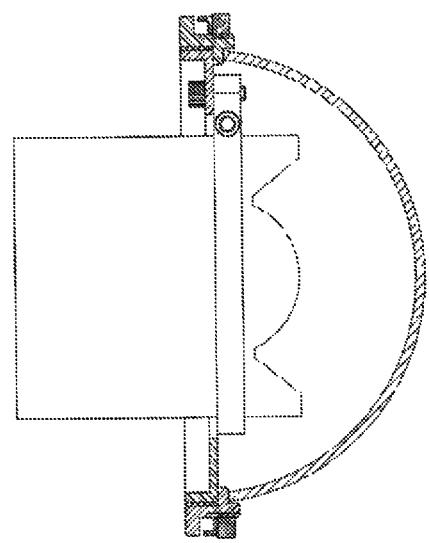
Figure 27:
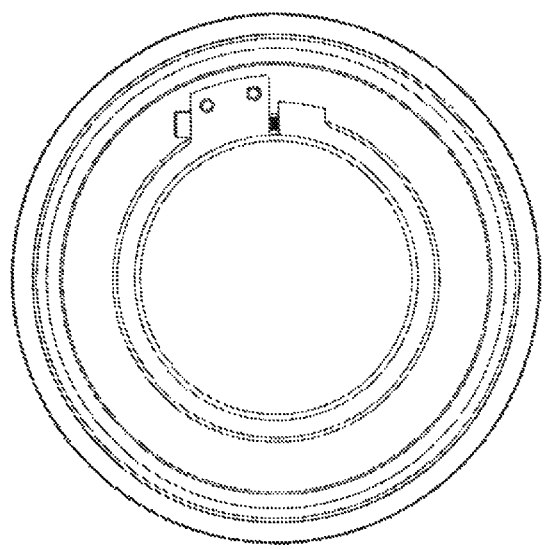
Figure 28:
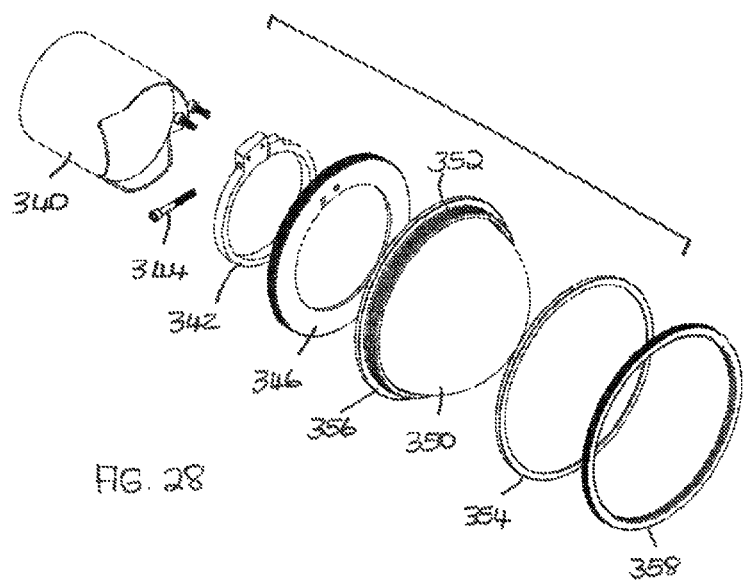
Figure 29:
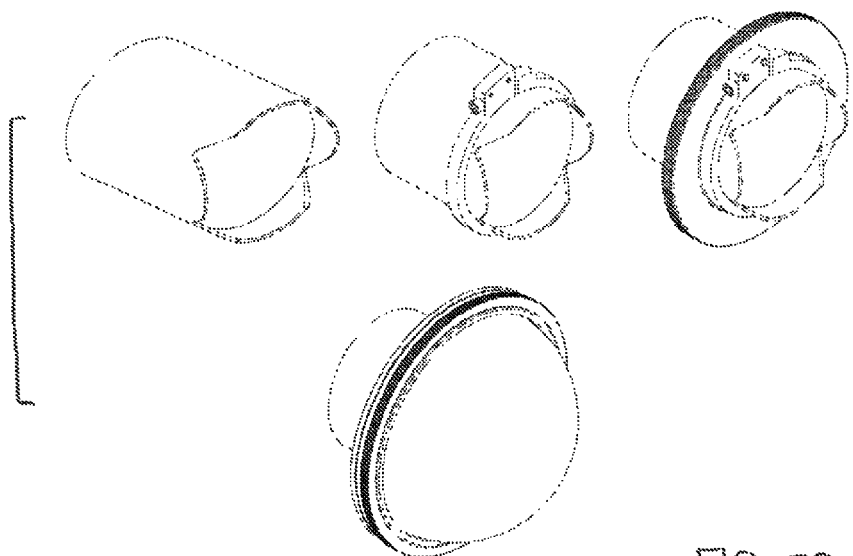
Figure 3D:
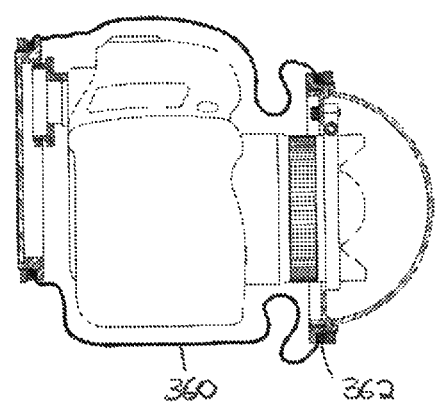
FIG. 3 is a detailed perspective view of the fore portion of the hermetic flexible bag and its respective structural disposition of the UV filter.

FIG. 26 shows a side view partially in section illustrating how the various components fit together, while FIG. 27 shows a front view of the arrangement. FIG. 29 shows in for sequential steps the process by means of which the domed port is attached to the front of the lens. FIG. 30 of the drawings shows a schematic side view of the domed port attached to the front of the lens, with the flexible bag 360 mounted around the camera, and the peripheral edge 362 of the flexible bag 360 being sealingly captured between the dome flange 356 and the various O-rings.

Figure 31:
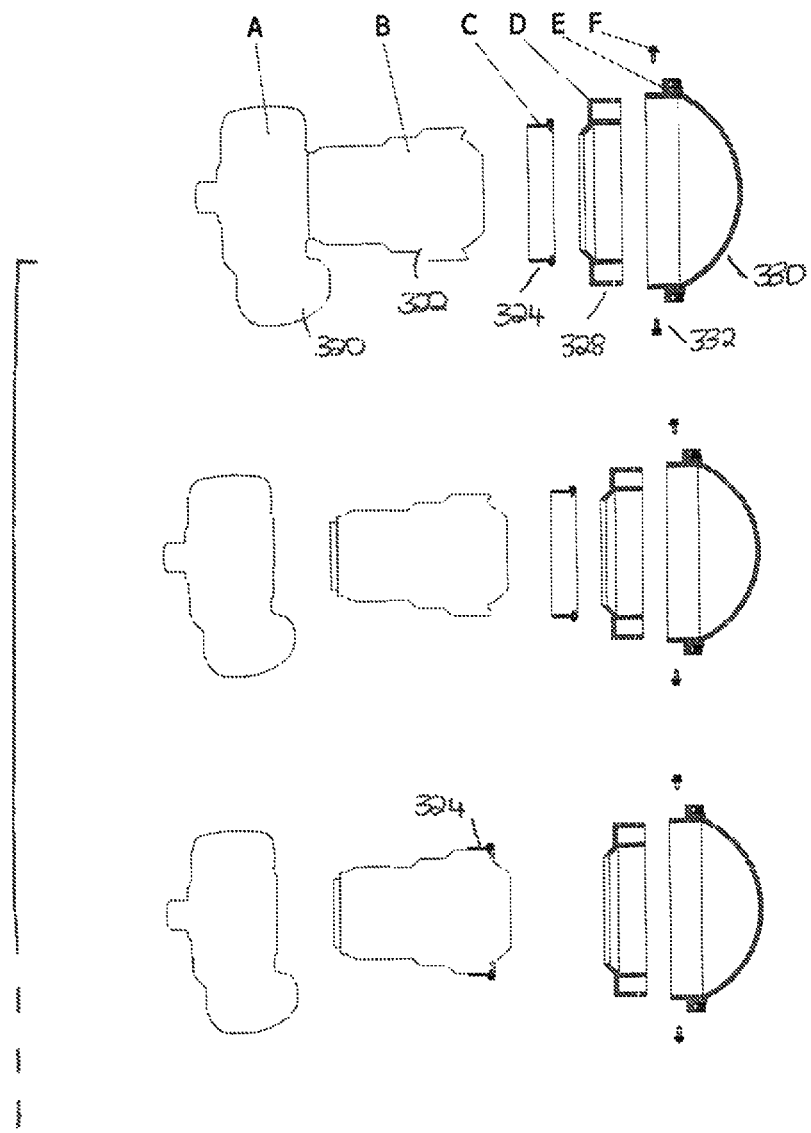
FIG. 31 is a series of sequential illustrations showing attachment of a domed port to a camera lens.
Figure 31:
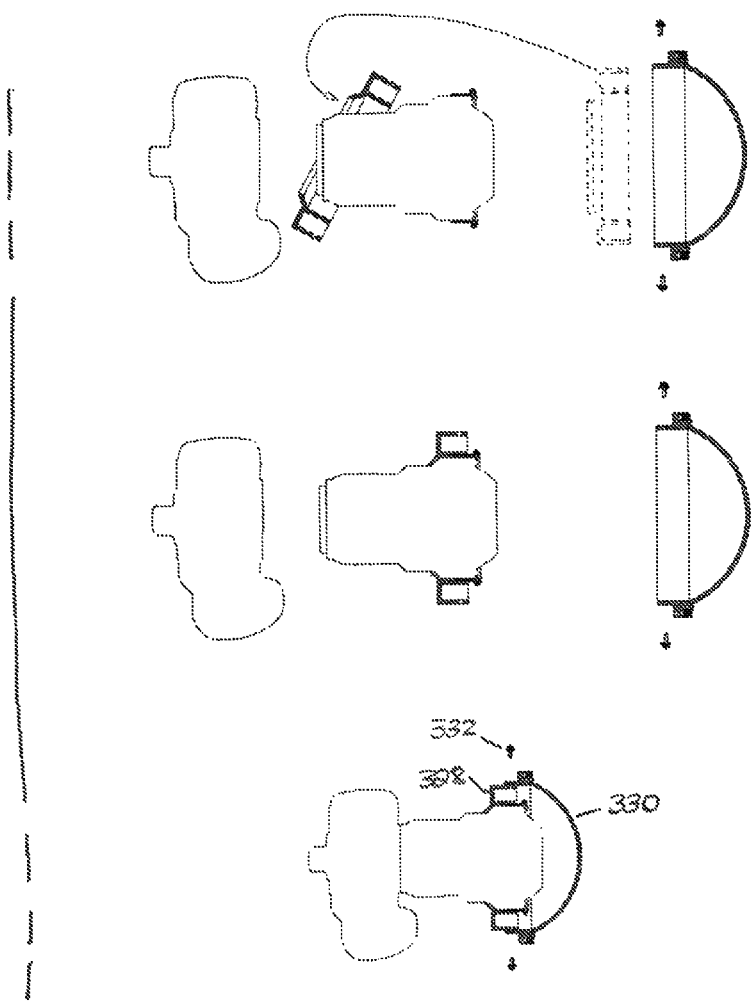
Figure 31:
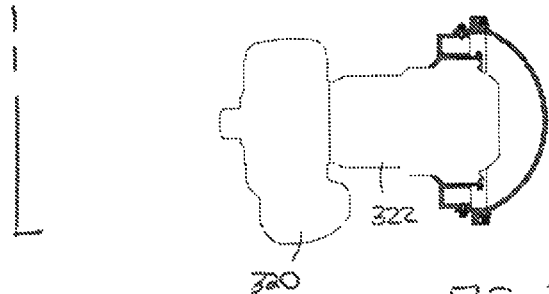

FIG. 31 of the drawings shows a series of seven sequential illustrations indicating the mechanism and procedure by means of which the domed port and its various components are attached to the camera. It is reiterated that this attachment occurs on the lens of the camera, and not on the body thereof, and it is at the free end of the lens where the attachment takes place.

The first drawing in FIG. 31 shows schematically a camera 320 attached to a lens 322. In front of the lens 322, there is located the lens attachment 324, the dome support 328, and the domed port 330. In the second drawing of FIG. 31, the lens 322 is removed from the camera 320. In the third drawing of FIG. 31, the lens attachment 324 is fastened onto the unattached end of the lens 322, in a similar manner to that which has been described with reference to FIG. 24 above. In the fourth drawing of FIG. 31, the dome support 328 is also mounted over the lens, from the rear or camera attachment side of the lens 322. The dome support 328 threadedly engages the lens attachment 324, as shown in the fifth drawing of FIG. 31, as can also be seen in FIG. 32 of the drawings.

In the sixth drawing in FIG. 31 of the drawings, the domed port 330 is engaged or connected with the dome support 328 by means of screws 332. In the seventh and last drawing in FIG. 31, the lens 322 has been reattached to the camera 320 and the wide angle dome structures are securely mounted at the end of the lens.

Figure 32:
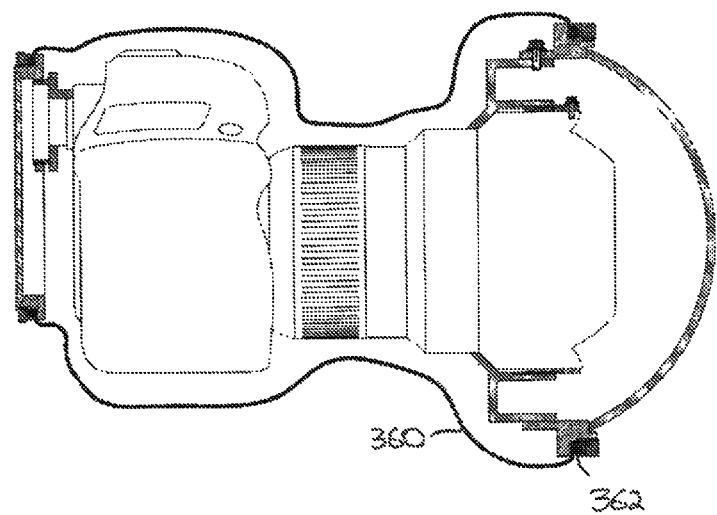
FIG. 32 is a side view of a camera having the domed port as illustrated in FIG. 31 with the protective cover thereon.

As will be seen in FIG. 32 of the drawings, a side schematic view of a camera and lens is shown, wherein the domed port and its associated components have been attached at the end of the lens, and a flexible bag 360 surrounds the camera and lens, with the peripheral edge 362 of the flexible bag being captured between the flange on the domed support structure, as well as the use of the two O-rings to ensure a air and watertight seal. The two O-rings will typically and preferably comprise the inner O-ring having a generally L-shaped cross-section, and the outer O-ring which engages using threads the dome structure so that it can be appropriately tightened to force the inner O-ring and flange of the domed structure nearest to each other to achieve the substantial air and watertight seal.

Flash Connecting Glove

A flash connecting glove may be provided to give support to the flexible bag particularly at the light emitting portion of a flash to thereby minimize any lost illumination from the flash (or other lighting component) that has been sealed within the hermetic enclosure. The flash connecting glove attaches to the flash or lighting component body utilizing a flexible material that conforms to multiple body types, shapes, and sizes of flashes. It may serve as an anchor to hold in place the opening for the transparent window through which the light passes from the flash to the outside of the flexible bag to provide the necessary lighting. This opening also preferably conforms to a shape that allows appropriate sealing, which may be modular, and that is interchangeable amongst multiple brands, shapes, and body types of camera or other equipment. Generally, the glove is lightweight, quick to instal, and often a single size will fit many or all devices.

Reference is made to FIGS. 33 to 36 of the drawings. These figures show the attachment body attached to the flash glove. A flat window is provided and is placed onto the attachment body, and o-rings are screwed onto the attachment body to establish the hermetic seal, as will be described in more detail below with reference to these figures.

Figure 34:
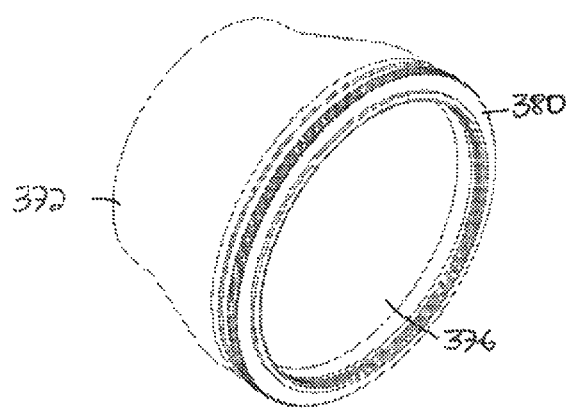
FIGS. 33 to 36 show a protective cover in accordance with the invention including a flash opening and attachment mechanism to the flash opening.
Figure 33:
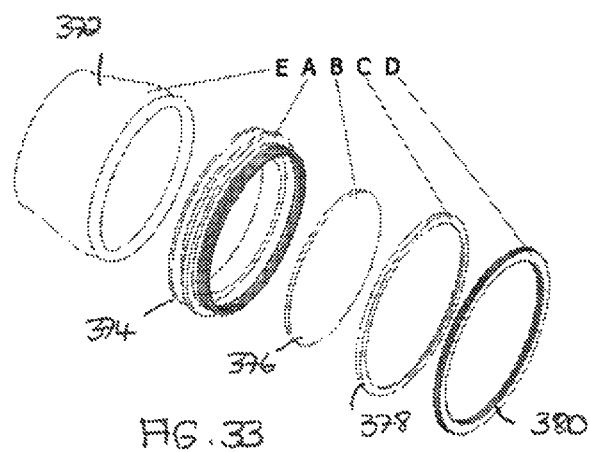

FIG. 33 shows the flash connecting glove 370 in an exploded configuration, while FIG. 34 shows the same flash connecting glove 370 in the closed or assembled configuration. The flash connecting glove 370 comprises a flash glove 372, a connector body 374, a window 376 received in the connector body 374, an inner O-ring 378, and an outer O-ring 380. These components can all be clearly seen in FIG. 33 of the drawings. FIG. 34 shows these components when assembled, in the form that they would be attached to the camera flash 382 (see FIG. 35 of the drawings), and ready for attachment to the flexible cover or bag 384, to be discussed further below.

Figure 35:
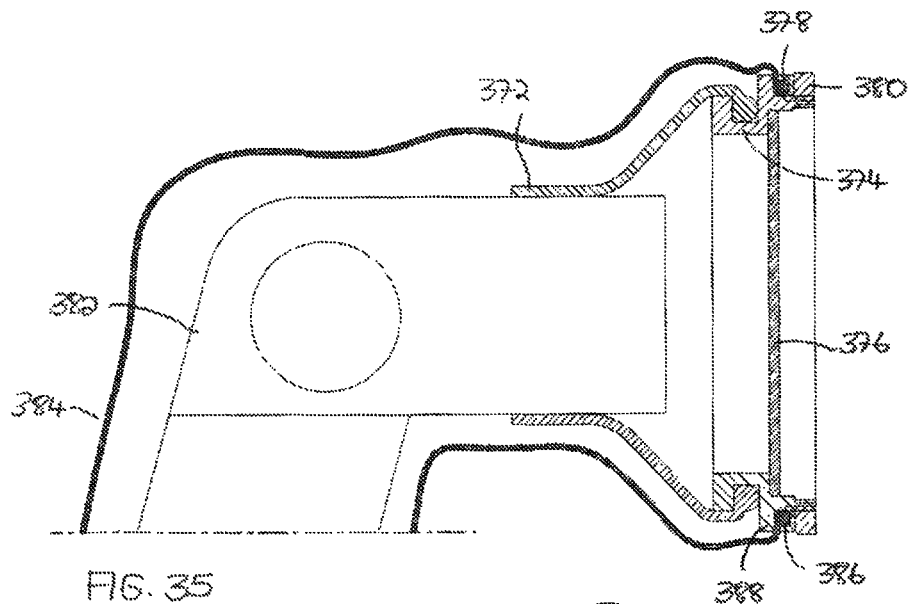

As seen in the detail of FIG. 35, the flash glove 372 is mounted on the end of the flash 382, with the window 376 positioned in front of that portion of the flash 382 which dispenses light, and providing a substantially clear optical passage for the flash light. The flash club 372 fits around the flash 382 and is held in a substantially fixed position relative to the flash 382 so that the window 376 is always appropriately positioned to allow the light from the flash to exit the bag 384.

The flexible bag 384 has a peripheral and 386 which fits against the flange 388 of the connector body 374. The inner O-ring 378, which as described in previous embodiments may be L-shaped in section, abuts up against the peripheral end 386 capturing the peripheral end 386 between the inner O-ring 378 and the flange 388. The outer O-ring 380 screws onto the threaded portion of the connector body 374 and is appropriately tightened so as to maintain the peripheral edge wedged between the flange 388 and the inner O-ring 378 to provide a substantially watertight and airtight seal.

Figure 36:
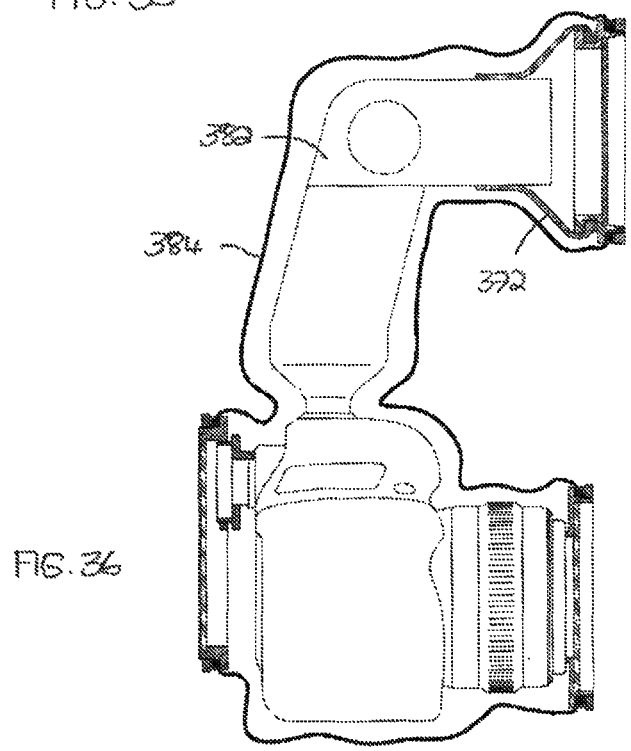

In FIG. 36 of the drawings, a side schematic view of a camera and lens is shown, with the flash mounted on the camera and incorporating the flash connecting glove and associated components as described above. The bag 384 surrounds the entire camera, lens and flash, and incorporates the flash connecting glove as described above, as well as the large-screen display viewfinder attached to the viewfinder of the camera. It also be seen in this FIG. 36 that the lens has attached thereto the hardware of the invention. The flexible bag 384 has three apertures corresponding to the light passage for the flash, the large-screen display viewfinder, and the lens, and therefore provides a good example of the invention where the flexible bag contains a camera and its components in a substantially airtight and watertight environment, but with characteristics that account for and permit all of the functions and operations of the camera, with good tactile interaction by the user.

Flat Port Optical Cover

In accordance with a further aspect of the invention, a flat port optical cover may be provided which moves the optical lens to the outer surface of the lens port. This helps reduce or eliminate any changes in surface area or angle between the various parts of the port. This flattening of the port and glass reduces or may eliminate any accumulation of external substances such as liquid.

Figure 37:
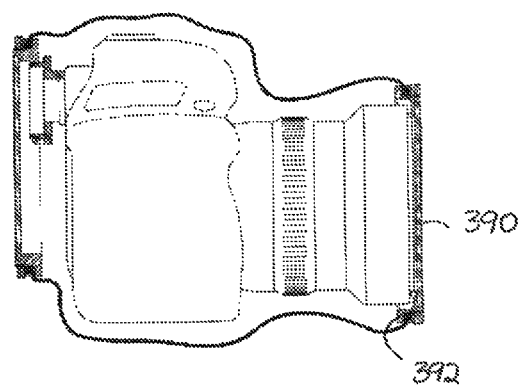
FIG. 37 is a side view of a camera having a flush flat port optical cover.

FIG. 37 shows a schematic side view of a camera and lens incorporating such a flat port optical cover in accordance with this aspect of the invention. It will be seen here that the window 390 is substantially flush with the connective frame 392 in which it is mounted, and the inner and outer O-rings, as already described above with reference to other embodiments, R utilized for mounting the connective frame at the front of the lens.

Tethered Hermetic Seal Between Devices; Cable Adaptor

A substantially water and air impermeable cable connector ("cable adaptor") may be provided which creates an impermeable or hermetic seal while allowing cables of various lengths and widths to pass through the seal. This offers a solution to the situation where a hermetic or airtight seal is required, but there is still a need for a cable extending between the inside of the covering or flexible bag where the equipment is located and the outside thereof for controlling physically certain aspects of the equipment such as the camera. In one embodiment of the invention, the cable adapter encompasses or surrounds the cable in question as it passes through the covering, and utilizes two rigid ends that squeeze a flexible or resilient third part between them, thereby providing a hermetic seal to the outside of the enclosure while allowing uninterrupted tethered cable connectivity. The cable passes through a center opening of both rigid ends of the cable connector apparatus. In between them, the flexible or resilient material envelops and seals against the cable, while also feeling against the rigid parts. The two rigid parts are screwed together, forcing the flexible material against their internal walls, and diminishing the internal space around the cable in a manner that envelops the cable sufficiently to provide an air and water tight seal.

Figure 40:
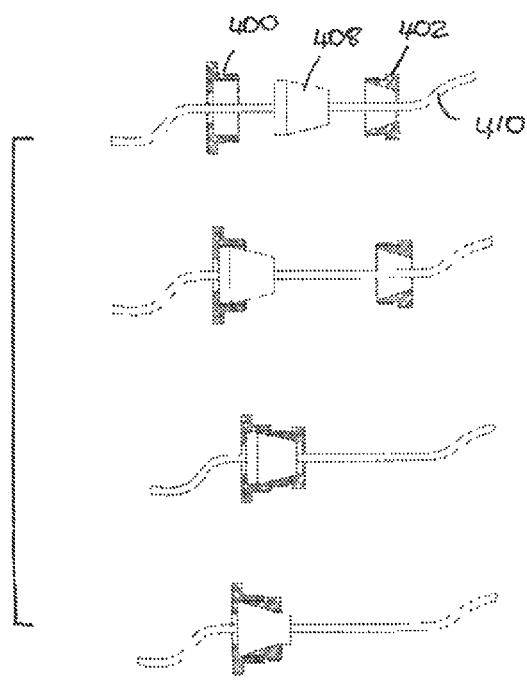
Figures 41, 42:
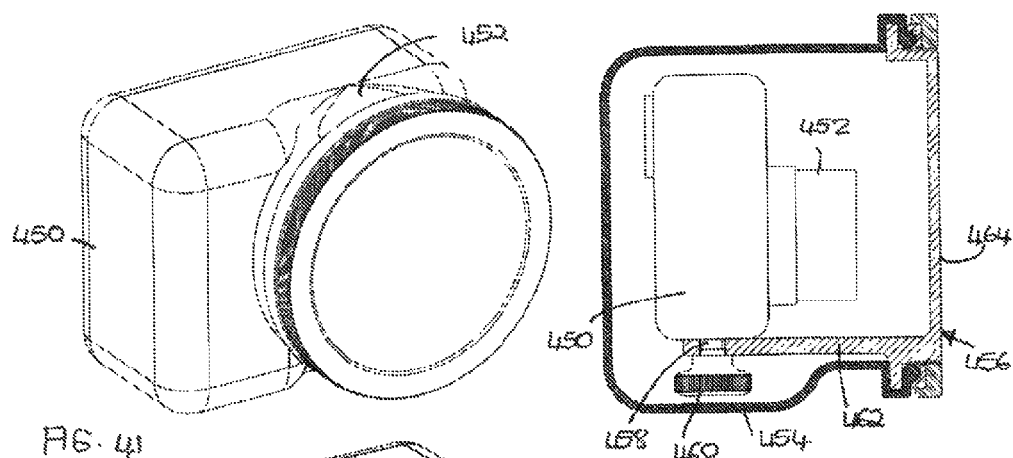
Figure 43:
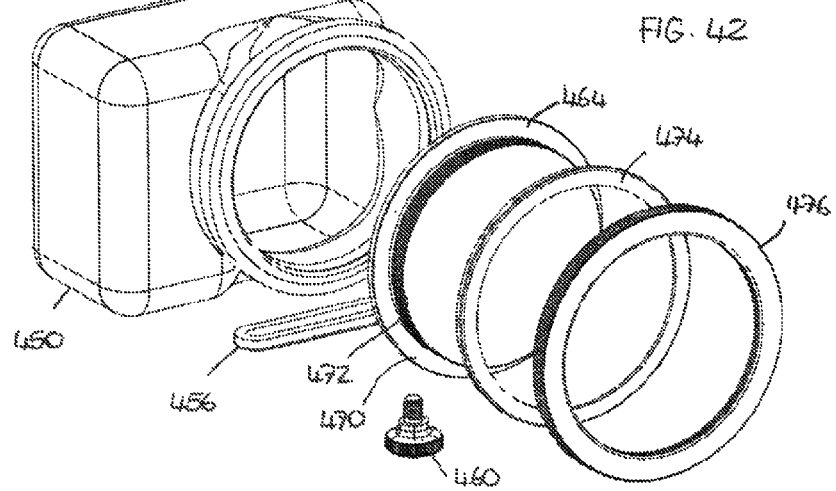

Reference is made to FIGS. 39 to 41 of the drawings which illustrate one embodiment of this aspect of the invention. The body consists of two parts, namely, first and second bodies 400 and 402, and attaches to the hermetic bag through the inner and outer o-rings 404 and 406, similar to those already described. These O-rings 404 and 406 provide the hermetic seal as a result of the screwing or twisting motion by the user, as described. The first and second bodies 400 and 402 generally have approximate symmetrical internal geometry. As the first body 400 is screwed on to the second body 402, a flexible body 408 located therebetween are compressed increasingly and fill in the space void between the first and second bodies 400 and 402 with each turn of the screw thread. The flexible body 408 fits between the first and second bodies 400 and 402, adding a malleable component that molds to the cable's dimensions and seals against the cable. At the same time, the flexible body 408 also seals against and between the first and second bodies 400 and 402.

The flexible body 408 can have different openings to accommodate different cables types and profiles depending on thickness, shapes, and the like, or it can be solid, with no opening of any kind, so as to function as a stopper of sorts, thereby creating an effective seal even without a cable connection for the hermetic bag.

FIG. 38 shows the seal device in the exploded and open position to reveal its various components, while FIG. 39 shows the seal device in the closed or assembled condition. The seal device may be used in this assembled condition, capturing the flexible bag and forming a substantially air and watertight seal there with, at the same time accommodating the cable which extends from inside of the flexible bag to the outside thereof, and facilitating control from the outside of the designated or selected function which the cable may operate.

FIG. 40 of the drawings shows a sequence of four illustrations indicating how the cable fits within the seal device. In the first drawing, the first body 402nd body 402 are separated with the flexible body 408 therebetween. A cable 410 extends to the center of each of these bodies. In the second sequence of the drawings, the malleable body 408 is received within the first body 400, and in the third sequence, the second body 402 is brought into contact with the first body 400. The first and second bodies 400 and 402 respectively all then secured to each other using appropriate threaded members, and sufficient tightening will distort the flexible body 408 so that it sealingly engages with both the sides of the first and second bodies, as well as the cable 410 which runs through it.

FIG. 41 of the drawings shows a sequence of five drawings each of which show a flexible body 408 having a central aperture 412 running therethrough. A radial slot 414 communicates between the central aperture 412 and the outside of the flexible body 408. The second and subsequent illustrations show how the cable is placed in the radial slot 414 and forced inwardly unto it is received completely within the central aperture 412. Since the flexible body 408 has some bending properties enabling it to be distorted or moved, it can be easily manipulated to ensure that the cable is easily placed into the central aperture 412.

Tripod-Anchored Enclosure for Compact Cameras

A compact enclosure may be provided in accordance with one aspect of the present invention, and may comprise a device which does not screw onto each extremity opening (that is, for example, the optical lens opening and viewable window opening) and therefore may use those openings as anchors or attachment points to the internal equipment. The enclosure or flexible bag may still have openings for the optical and viewable windows, which just "float", but it does not use these openings for securing to the internal equipment, only for optical access. In this embodiment of the invention, the compact enclosure uses the internal equipment's (that is, the camera's) tripod mount opening to screw onto, utilizing an adjustable arm that extends towards the front optical opening where it in turn secures to a front port directly or immediately in front of where the camera's front lens would be. Combined with the flexible properties of the hermetic bag, which simultaneously exerts force to keep the front port flush with the internal lens, this adjustable arm offers support so the front port position is directly synchronized by the internal equipment's lens movements, (backwards and forwards). In other words, the combined flexible properties of the hermetic bag and the adjustable mounted bracket holding the front port in place allows this feature of the invention to work with a variety of compact cameras, and not just those with removable lenses, even when they do not allow the hermetic bag and optical ports (such as the viewfinder and optical window) to screw onto the filter thread and viewfinder tracks.

This particular aspect of the invention, namely, the tripod anchored enclosure which may have particularly useful application for compact cameras, is illustrated in FIGS. 41 to 45 of the accompanying drawings. These figures show a camera 450 with lens 452 contained in an enclosure 454. A bracket 456 attaches to the camera 450 at the tripod mount 458 using a screw 460. The bracket 456 as a forwardly extending horizontal portion 462, and a vertical portion 464 of generally circular shape. The bracket 456 further comprises an adjustment portion 466 including a slot 468 through which the screw 460 passes. The position of the bracket 456 may therefore be laterally and radially adjusted by loosening the screw 466 and moving the adjustment portion 466 until it is in the desired position, following which the screw 460 is tightened to secure the bracket 456 relative to the camera 450.

The enclosure 454 attaches to and is held in place by the vertical portion 464, as best seen in FIG. 42 of the drawings. The vertical portion 464 comprises a light transmitting window therein, located in front of the lens 452, four suitable photography.

The vertical portion 464 includes a flange 470 and a threaded portion 472. There is further provided an inner O-ring of generally L-shaped cross-section and an outer O-ring 476. The peripheral edge opening of the enclosure 454 is captured between the flange 470 and the inner O-ring 474, as clearly illustrated in FIG. 42 of the drawings. The outer O-ring attaches to the threaded portion 472 of the vertical portion 464, and is appropriately tightened until the peripheral edge of the enclosure 454 is squeezed between the flange 470 and the inner O-ring 474 to form a substantially airtight and watertight seal between the bracket 456 and the enclosure 454.

Tripod Adaptor

A tripod adapter may be provided in accordance with one aspect of the invention. The tripod adapter extends the usability of standard tripod equipment while the hermetic bag of the present invention is in use. It therefore maintains a waterproof seal of the equipment inside while allowing the user to attach standard tripods to the equipment.

One embodiment of the invention in so far as it relates to the tripod adapter is illustrated in FIGS. 46 to 48 of the drawings. In these drawings, the tripod adaptor 490 may consist of a body 492 having a male threaded component 494 on top and a female threaded 496 component on the bottom. The body further comprises mail thread 498. The body 492 attaches on its top side by means of the male threaded component 494 to equipment's tripod connector inside the bag. The tripod adapter 490 has a lip 500 which allows the flexible bag 502 to be hermetically squeezed by the o-rings 504 and 506 as the user screws them onto the body, while maintaining a tripod female opening 496 exposed outside the bag for selectively connecting to the tripod when it is being used.

Floating Viewfinder Tripod Adaptor

Figure 49:
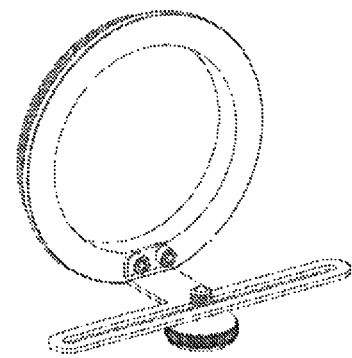
FIGS. 49 to 51 show a protective cover in accordance with the present invention including a floating viewfinder connected to the camera by a bracket attached to the tripod connector.
Figure 50:
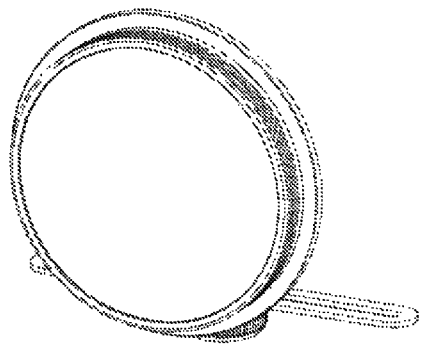
Figure 51:
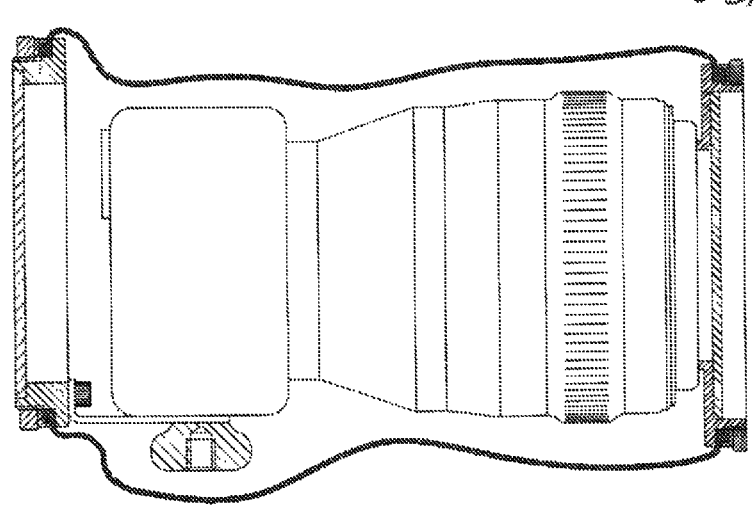

In another aspect, the present invention provides for an adapter that utilizes the camera's tripod mount to create a flexible, adjustable mount for viewing window. The floating viewfinder tripod mount adaptor enables the user to mount it to the camera's tripod opening by using an adjustable bracket that holds the viewfinder in place where desired. This embodiment of the invention is illustrated in FIGS. 49 to 51 of the drawings. These drawings show a bracket attached to the tripod connector on the camera, the bracket supporting a viewfinder mount at the rear of the camera to provide the user with access to the viewing of the viewfinder.

The invention claimed is:

1. A protective cover for a camera having a lens and an image viewer, the protective cover comprising:
   a molded elasticized housing forming a chamber having a body shaped portion and a lens shaped portion for receiving the camera and lens respectively, the housing having at least one opening with a peripheral edge;
   a fastening system for the opening, the fastening system having an internal fastener attachable to a part of the camera and an external fastener attachable to the internal fastener, the internal fastener and external fastener capturing therebetween the peripheral edge of the lens opening when secured to each other, the external fastener being movable from a rest view position to an alternate view position to view a wider area of the camera or lens.

2. A protective cover as claimed in claim 1 wherein the external fastener is movable between a rest view position and a alternate view position such that the external fastener can be moved back to the rest view position from the alternate view position when released by the user.

3. A protective cover as claimed in claim 1 wherein the external fastener is attached to the internal fastener by a threaded connection.

4. A protective cover as claimed in claim 1 wherein the external fastener is attached to the internal fastener by a snap on connection.

5. A protective cover as claimed in claim 1 wherein the external fastener comprises a relatively large diameter ring portion and a window sealingly mounted in the ring portion.

6. A protective cover for a camera having a lens and an image viewer, the protective cover comprising:
   a molded elasticized housing forming a chamber having a body shaped portion and a lens shaped portion for receiving the camera and lens respectively, the housing having at a lens opening with a peripheral edge;
   a fastening system for the opening, the fastening system having an internal fastener attachable to the lens of the camera and an external fastener attachable to the internal fastener, the internal fastener and external fastener capturing therebetween the peripheral edge of the lens opening when secured to each other, the external fastener comprising a dome shaped window.

7. A protective cover for a camera as claimed in claim 6 wherein the internal fastener comprises a dome support for supporting and attaching to the external fastener having the dome shaped window, the dome support and external fastener capturing therebetween the peripheral edge at the lens opening.

8. A protective cover for a camera having a lens and a flash, the protective cover comprising:
   a molded elasticized housing forming a chamber having a body shaped portion for receiving the camera, the lens and the flash respectively, the housing having at least one opening through which light generated by the flash is transmitted, the opening having a peripheral edge;
   a fastening system for the opening, the fastening system having a glove for mounting on the flash, an internal fastener attachable to the glove, and an external fastener attachable to the internal fastener, the internal fastener and external fastener capturing therebetween the peripheral edge of the opening when secured to each other.

9. A protective cover as claimed in claim 8 wherein the glove comprises a first end which engages the flash and a second end opposite from the first end which attaches to the internal fastener.

10. A protective cover for a camera having a lens and an image viewer, the protective cover comprising:
    a molded elasticized housing forming a chamber having a body shaped portion and a lens shaped portion for receiving the camera and lens respectively, the housing having at least one opening with a peripheral edge;
    a fastening system for the opening, the fastening system having an internal fastener with an inlet aperture and an external fastener with an outlet aperture and attachable to the internal fastener, the internal fastener and external fastener capturing therebetween the peripheral edge of the opening when secured to each other, the fastening system further comprising a resilient plug having a channel therethrough and located between the internal fastener and external fastener, the plug having a channel therethrough and being squeezed between the internal fastener and external fastener to form a sealed attachment, the inlet aperture, the channel and the outlet aperture providing a conduit for a cable extending from outside of the cover to the inside thereof, the resilient plug forming a seal with the cable.

11. A protective cover as claimed in claim 10 wherein the plug has a frusto-conical shaped portion, which is engaged by a substantially similarly shaped portion on either the external fastener or the internal fastener.

12. A protective cover as claimed in claim 11 wherein the plug comprises a slot extending from the channel thereof to the outer surface thereof, the slot facilitating insertion of a cable in the channel of the plug.

13. A protective cover for a camera having a lens and a tripod attachment, the protective cover comprising:
    a molded elasticized housing forming a chamber having a body shaped portion and a lens shaped portion for receiving the camera and lens respectively, the housing having an opening with a peripheral edge at the tripod attachment;
    a fastening system for the opening, the fastening system having an internal fastener attachable to the tripod attachment and an external fastener attachable to the internal fastener, the internal fastener and external fastener capturing therebetween the peripheral edge of the opening when secured to each other.

* * * * *